United States Patent [19]
Ohki

[11] Patent Number: 5,590,066
[45] Date of Patent: Dec. 31, 1996

[54] TWO-DIMENSIONAL DISCRETE COSINE TRANSFORMATION SYSTEM, TWO-DIMENSIONAL INVERSE DISCRETE COSINE TRANSFORMATION SYSTEM, AND DIGITAL SIGNAL PROCESSING APPARATUS USING SAME

[75] Inventor: Mitsuharu Ohki, Tokyo, Japan

[73] Assignee: Sony Corporation, Tokyo, Japan

[21] Appl. No.: 310,342

[22] Filed: Sep. 22, 1994

[30] Foreign Application Priority Data

Sep. 24, 1993 [JP] Japan ................................. 5-238526

[51] Int. Cl.$^6$ ........................................... G06F 17/14
[52] U.S. Cl. ............................................. 364/725
[58] Field of Search ....................................... 364/725

[56] References Cited

U.S. PATENT DOCUMENTS

| | | | |
|---|---|---|---|
| Re. 34,734 | 9/1994 | Cambonie | 364/725 |
| 5,117,381 | 5/1992 | Juri et al. | 364/725 |
| 5,163,103 | 11/1992 | Vetani | 364/725 |
| 5,257,213 | 10/1993 | Kim et al. | 364/725 |
| 5,276,784 | 1/1994 | Ohki | 364/725 |
| 5,420,811 | 5/1995 | Ohki | 364/725 |

*Primary Examiner*—David H. Malzahn
*Attorney, Agent, or Firm*—Williams S. Frommer; Alvin Sinderbrand

[57] ABSTRACT

A two-dimensional DCT system having a first calculation circuit, a rearrangement circuit, a second calculation circuit and a multiplier, and a two-dimensional IDCT system having a multiplier, a first calculation circuit, a rearrangement circuit, and a second calculation circuit. Each of these elements is adapted to receive data in a serial form, process the received data in its serial form, and output data in a serial form. As a result, serial-to-parallel converters and parallel-to-serial converters which may have a relatively large number of registers or hold circuits are not needed.

8 Claims, 15 Drawing Sheets

FIG. 10

| CYCLE No. | CALCULATION AT AS1 | CALCULATION AT MPY | CALCULATION AT AS2 | CALCULATION AT ADD | CALCULATION AT SUB |
|---|---|---|---|---|---|
| 6 |  |  |  | R0 (xx3) + R1 (xx4) ⇒ R2 (xp3) | R0 (xx3) − R1 (xx4) ⇒ R1 (xp4) |
| 7 |  |  |  | R0 (xx2) + R3 (xx5) ⇒ R4 (xp2) | R0 (xx2) − R3 (xx5) ⇒ R1 (xp5) |
| 8 |  | R1 (xp6) × 2A4 |  | R0 (xx1) + R6 (xx6) ⇒ R7 (xp1) | R0 (xx1) − R6 (xx6) ⇒ R1 (xp6) |
| 9 |  | R1 (xp7) × 2A4  R3 (xq5) | R2 (xp5) + R1 (xp6) ⇒ R3 (xq6) | R0 (xx0) + R6 (xx7) ⇒ R7 (xp0) | R0 (xx0) − R6 (xx7) ⇒ R1 (xp7) |
| 10 |  | R3 (xq4) | R4 (xp4) + R1 (xp7) ⇒ R5 (xq7) | R8 (xp1) + R8 (xp2) ⇒ R9 (xr1) | R8 (xp1) − R6 (xp2) ⇒ R7 (xr3) |
| 11 |  | R7 (xr2) × 2A4  R9 (xs2) | R8 (xr3) + R7 (xr2) ⇒ R9 (xs3) | R8 (xp0) + R8 (xp3) ⇒ R9 (xr0) | R8 (xp0) − R6 (xp3) ⇒ R7 (xr2) |
| 12 | R10 (xr1) + R9 (xr0) ⇒ R12 (yy0) | R7 (xr4) × 2A2  R9 (xs4) | R8 (xr5) + R7 (xr4) ⇒ R9 (xs5) | R4 (xp5) + R6 (xq7) ⇒ R7 (xr5) | R4 (xp5) − R6 (xq7) ⇒ R5 (xr7) |
| 13 | R10 (xr0) − R11 (xr1) ⇒ R12 (yy4) | R7 (xr6) × 2A6  R9 (xs6) | R8 (xr7) + R7 (xr6) ⇒ R9 (xs7) | R4 (xq4) + R6 (xq6) ⇒ R7 (xr4) | R4 (xq4) − R6 (xq6) ⇒ R5 (xr6) |
| 14 | R10 (xr3) + R9 (xr2) ⇒ R12 (yy2) |  | R8 (xr5) + R7 (xr4) ⇒ R9 (xs5) |  |  |
| 15 | R10 (xr2) − R11 (xr3) ⇒ R12 (yy6) |  | R8 (xr7) + R7 (xr6) ⇒ R9 (xs7) |  |  |
| 16 | R10 (xr5) + R9 (xr4) ⇒ R12 (yy1) |  |  |  |  |
| 17 | R10 (xr4) − R11 (xr5) ⇒ R12 (yy5) |  |  |  |  |
| 18 | R10 (xr7) + R9 (xr6) ⇒ R12 (yy3) |  |  |  |  |
| 19 | R10 (xr6) − R11 (xr7) ⇒ R12 (yy5) |  |  |  |  |

NO CALCULATION AT CYCLES 1 TO 5 AND 20
Ai = 2 × cos (i × π/16)

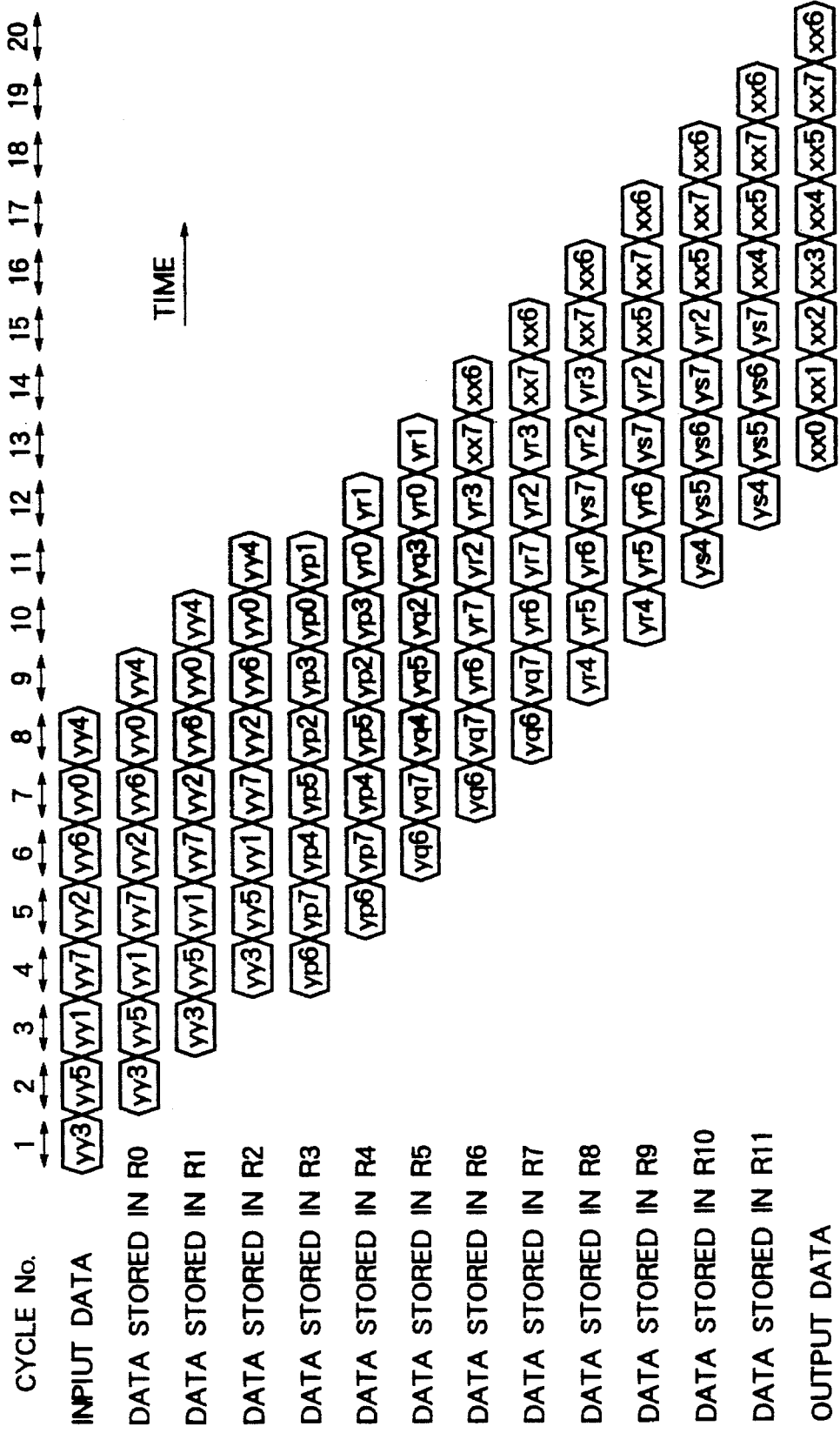

FIG. 14

| CYCLE No. | CALCULATION AT AS1 | CALCULATION AT MPY | CALCULATION AT AS2 | CALCULATION AT ADD | CALCULATION AT SUB |
|---|---|---|---|---|---|
| 3 | R0(yy5)+R1(yy3)⇒R3(yp6) | | | | |
| 4 | R2(yy3)−R1(yy5)⇒R3(yp7) | R3(yp6)×AA6 | | | |
| 5 | R0(yy7)+R1(yy1)⇒R3(yp4) | R5(yq6) | | | |
| 6 | R2(yy1)−R1(yy7)⇒R3(yp5) | R3(yp4)×AA2 | R4(yp7)−R5(yq6)⇒R5(yq7) | | |
| 7 | R0(yy6)+R1(yy2)⇒R3(yp2) | R5(yq4) | | | |
| 8 | R2(yy2)−R1(yy6)⇒R3(yp3) | R3(yp2)×AA4 | R4(yp5)−R5(yq4)⇒R5(yq5) | R5(yq4)+R7(yq6)⇒R8(yr4) | R5(yq4)−R7(yq6)⇒R6(yr6) |
| 9 | R0(yy4)+R1(yy0)⇒R3(yp0) | R8(yr4)×AA4 R5(yq2) | R4(yp3)−R5(yq2)⇒R5(yq3) | R5(yq5)+R7(yq7)⇒R8(yr5) | R5(yq5)−R7(yq7)⇒R6(yr7) |
| 10 | R2(yy0)−R1(yy4)⇒R3(yp1) | R8(yr5)×AA4 R10(yr4) | R4(yp1)−R5(yq0)⇒R5(yq1) | R3(yp0)+R5(yq2)⇒R4(yr0) | R3(yp0)−R5(yq2)⇒R6(yr2) |
| 11 | | R10(ys5) | R7(yr7)−R10(ys4)⇒R8(ys7) | R3(yp1)+R5(yq3)⇒R4(yr1) | R3(yp1)−R5(yq3)⇒R6(yr3) |
| 12 | | | R9(yr6)−R10(ys5)⇒R10(ys6) | R5(yr0)+R11(ys4)⇒R12(xx0) | R5(yr0)−R11(ys4)⇒R6(xx7) |
| 13 | | | | R5(yr1)+R11(ys5)⇒R12(xx1) | R5(yr1)−R11(ys5)⇒R6(xx6) |
| 14 | | | | R8(yr3)+R11(ys6)⇒R12(xx2) | R8(yr3)−R11(ys6)⇒R9(xx5) |
| 15 | | | | R10(yr2)+R11(ys7)⇒R12(xx3) | R10(yr2)−R11(ys7)⇒R11(xx4) |

NO CALCULATION AT CYCLES 1,2, AND 16 TO 20
$AA_i = 2 \times \cos(i \times \pi/16)$

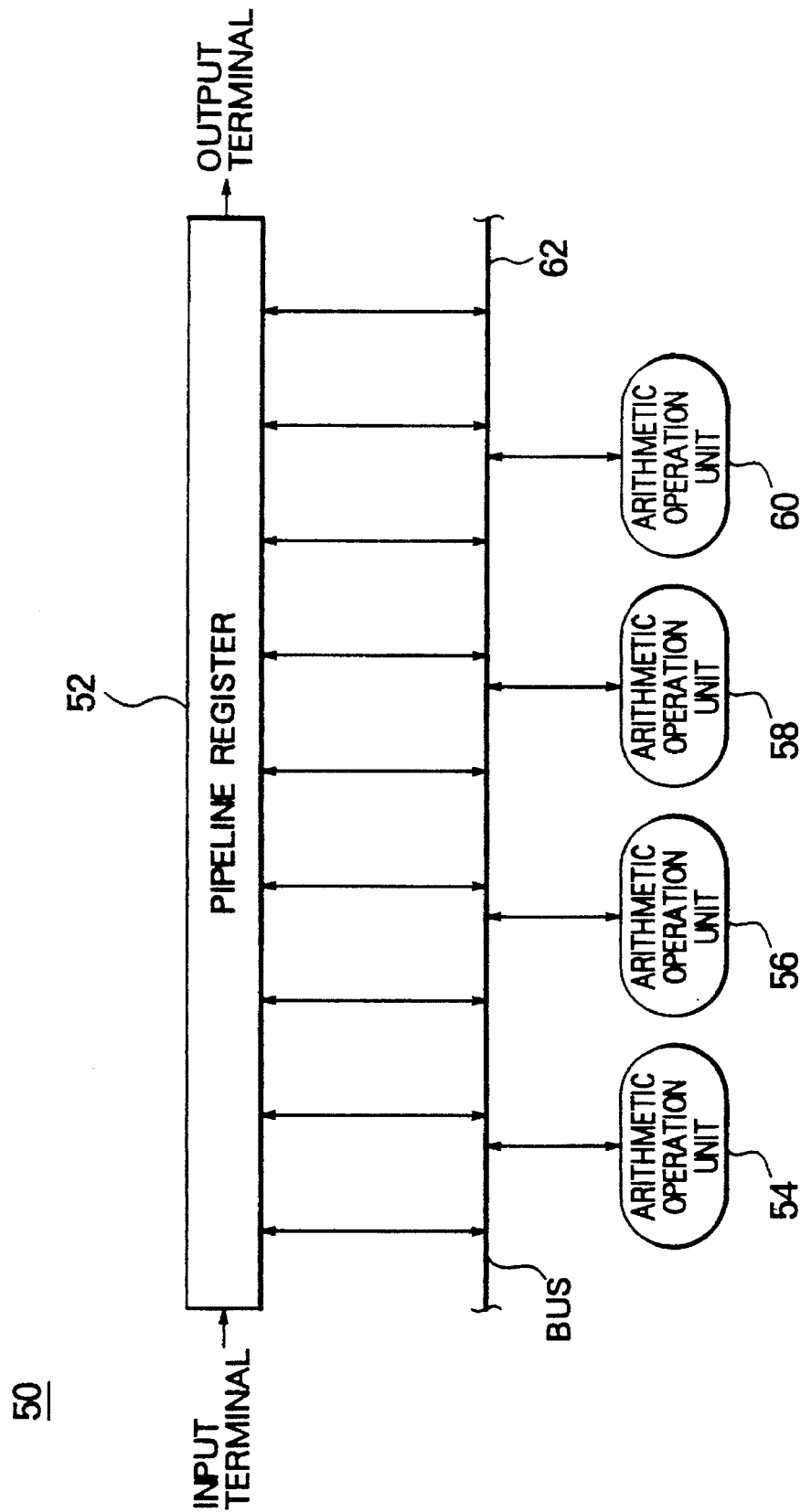

TWO-DIMENSIONAL DISCRETE COSINE TRANSFORMATION SYSTEM, TWO-DIMENSIONAL INVERSE DISCRETE COSINE TRANSFORMATION SYSTEM, AND DIGITAL SIGNAL PROCESSING APPARATUS USING SAME

BACKGROUND OF THE INVENTION

1. Field of the Invention

The present invention relates to a digital signal processing apparatus, more particularly relates to a two-dimensional discrete cosine transformation (DCT) system, a two-dimensional inverse discrete cosine transformation (IDCT) system, and a method of processing using the same.

2. Description of the Related Art

In recent years, systems using two-dimensional DCT and two-dimensional IDCT have become the mainstream systems in the field of image compression. Two-dimensional 8×8 DOT and two-dimensional 8×8 IDCT are expressed by the following equation 1.

$$[C] = (1/4) [N][X][N^t] \quad (1)$$

where,

[X] is an input data matrix, and

[C] is an output data matrix.

IDCT: $[X] = (1/4) [N^t][C][N]$ where,

[C] is an input data matrix, and

[X] is an output data matrix.

In equation 1, the superscript "$t$" indicates a transpose matrix. Therefore, $[N^t]$ and $[N]$ are transpose matrices of each other.

In equation 1, [X] denotes for example 8×8 real (time) domain image matrix data, [C] denotes 8×8 frequency domain matrix data corresponding to [X], and [N] denotes a 8×8 constant data matrix for transforming [C] to [x].

The constant data matrix [N] can be expressed by the following equation 2 and the transpose matrix $[N^t]$ by the following equation 3:

$$[N] = \begin{pmatrix} +a4 & +a4 & +a4 & +a4 & +a4 & +a4 & +a4 & +a4 \\ +a1 & +a3 & +a5 & +a7 & -a7 & -a5 & -a3 & -a1 \\ +a2 & +a6 & -a6 & -a2 & -a2 & -a6 & +a6 & +a2 \\ +a3 & -a7 & -a1 & -a5 & +a5 & +a1 & +a7 & -a3 \\ +a4 & -a4 & -a4 & +a4 & +a4 & -a4 & -a4 & +a4 \\ +a5 & -a1 & +a7 & +a3 & -a3 & -a7 & +a1 & -a5 \\ +a6 & -a2 & +a2 & -a6 & -a6 & +a2 & -a2 & +a6 \\ +a7 & -a5 & +a3 & -a1 & +a1 & -a3 & +a5 & -a7 \end{pmatrix} \quad (2)$$

where, $a_i = \cos(i \times \pi/16)$ i=1~7

$$[N^t] = \begin{pmatrix} +a4 & +a1 & +a2 & +a3 & +a4 & +a5 & +a6 & +a7 \\ +a4 & +a3 & +a6 & -a7 & -a4 & -a1 & -a2 & -a5 \\ +a4 & +a5 & -a6 & -a1 & -a4 & +a7 & +a2 & +a3 \\ +a4 & +a7 & -a2 & -a5 & +a4 & +a3 & -a6 & -a1 \\ +a4 & -a7 & -a2 & +a5 & +a4 & -a3 & -a6 & +a1 \\ +a4 & -a5 & -a6 & +a1 & -a4 & -a7 & +a2 & -a3 \\ +a4 & -a3 & +a6 & +a7 & -a4 & +a1 & -a2 & +a5 \\ +a4 & -a1 & +a2 & -a3 & +a4 & -a5 & +a6 & -a7 \end{pmatrix} \quad (3)$$

where, ai=cos (i×π/16) i=1~7

If a two-dimensional 8×8 DCT or IDCT calculation is performed by just simply calculating equation 1, the number of multiplication operations becomes extremely great and it suffers from the disadvantages of a massive amount of hardware including a large number of multipliers becomes necessary.

To overcome this disadvantage, the assignee of this application disclosed in Japanese Patent Publication (Kokai) No.6(1994)-35952, a two-dimensional 8×8 DCT system able to reduce the number of multiplication operations in the DCT by dissolving the constant data matrix [N] shown in equation 1 into a matrix [W] of a diagonal component of irrational numbers and other components of all "0" and a matrix [M] of components of irrational numbers, "+1", or "−1", dissolving the constant data matrix $[N^t]$ into a matrix $[W^t]$ of the transpose matrix of the above matrix [W] and matrix $[M^t]$ of the transpose matrix of the matrix [M], and performing the calculation based on these dissolved determinants.

With this two-dimensional 8×8 DCT system, it was possible to transform the DCT equation expressed by equation 1 to equation 4 and calculate equation 4 by a routine of the following steps S1 to S3 so as to reduce the number of multiplication operations and therefore keep down the increase in size of computation circuits caused by an increase in the number of multipliers.

$$[C] = (1/4) [N][X][N^t] \quad (4)$$
$$= (1/4) [W][M][X][M^t][W^t]$$

S1 : Calculation of $[Y] = [M][X]$ (5)

S2 = Calculation of $[Z] = [Y][M^t]$

S3 = Calculation of $[C] = (1/4) [W][Z][W^t]$

The matrix [W] in equation 4 can be expressed by the following equation 6:

$$[W] = \begin{pmatrix} a4 & 0 & 0 & 0 & 0 & 0 & 0 & 0 \\ 0 & a7 & 0 & 0 & 0 & 0 & 0 & 0 \\ 0 & 0 & a6 & 0 & 0 & 0 & 0 & 0 \\ 0 & 0 & 0 & a5 & 0 & 0 & 0 & 0 \\ 0 & 0 & 0 & 0 & a4 & 0 & 0 & 0 \\ 0 & 0 & 0 & 0 & 0 & a3 & 0 & 0 \\ 0 & 0 & 0 & 0 & 0 & 0 & a2 & 0 \\ 0 & 0 & 0 & 0 & 0 & 0 & 0 & a1 \end{pmatrix} \quad (6)$$

where, $a_i = \cos(i \times \pi/16)$, i=1 to 7

The matrix [M] in equation 4 can be expressed by the following equation 7:

$$[M] = \begin{pmatrix} +1 & +1 & +1 & +1 & +1 & +1 & +1 & +1 \\ +a17 & +a37 & +a57 & +1 & -1 & -a57 & -a37 & -a17 \\ +a26 & +1 & -1 & -a26 & -a26 & -1 & +1 & +a26 \\ +a35 & -a75 & -a15 & -1 & +1 & +a15 & +a75 & -a35 \\ +1 & -1 & -1 & +1 & +1 & -1 & -1 & +1 \\ +a53 & -a13 & +a73 & +1 & -1 & -a73 & +a13 & -a53 \\ +a62 & -1 & +1 & -a62 & -a62 & +1 & -1 & +a62 \\ +a71 & -a51 & +a31 & -1 & +1 & -a31 & +a51 & -a71 \end{pmatrix} \quad (7)$$

where, ai=cos (i×π/16) i=1~7

Further, the matrix $[W^t]$ and matrix $[M^t]$ in equation 4 are transpose matrices of the matrix [W] and matrix [M] and can be expressed by the following equations 8 and 9:

$$[W^r] = \begin{pmatrix} a4 & 0 & 0 & 0 & 0 & 0 & 0 & 0 \\ 0 & a7 & 0 & 0 & 0 & 0 & 0 & 0 \\ 0 & 0 & a6 & 0 & 0 & 0 & 0 & 0 \\ 0 & 0 & 0 & a5 & 0 & 0 & 0 & 0 \\ 0 & 0 & 0 & 0 & a4 & 0 & 0 & 0 \\ 0 & 0 & 0 & 0 & 0 & a3 & 0 & 0 \\ 0 & 0 & 0 & 0 & 0 & 0 & a2 & 0 \\ 0 & 0 & 0 & 0 & 0 & 0 & 0 & a1 \end{pmatrix} \quad (8)$$

where, $ai=\cos(i\times\pi/16)$ $i=1\sim 7$ $$[M^r] = \begin{pmatrix} +1 & +a17 & +a26 & +a35 & +1 & +a53 & +a62 & +a71 \\ +1 & +a37 & +1 & -a75 & -1 & -a13 & -1 & -a51 \\ +1 & +a57 & -1 & -a15 & -1 & +a73 & +1 & +a31 \\ +1 & +1 & -a26 & -1 & +1 & +1 & -a62 & -1 \\ +1 & -1 & -a26 & +1 & +1 & -1 & -a62 & +1 \\ +1 & -a57 & -1 & +a15 & -1 & -a73 & +1 & -a31 \\ +1 & -a37 & +1 & +a75 & -1 & +a13 & -1 & +a51 \\ +1 & -a17 & +a26 & -a35 & +1 & -a53 & +a62 & -a71 \end{pmatrix} \quad (9)$$

where, $ai=\cos(i\times\pi/16)$ $i=1\sim 7$

FIG. 1 is a view of the configuration of a two-dimensional 8×8 DCT system (apparatus) 100 for performing the calculation of equation 4.

As shown in FIG. 1, the two-dimensional 8×8 DCT system 100 is comprised of a serial/parallel converter 121, a calculation circuit 122, a rearrangement circuit 123, a calculation circuit 124, a parallel/serial converter 125, and a multiplier 126.

In the two-dimensional 8×8 DCT system 100, the image data, that is, the matrix [X], is received serially, the matrix [X] is converted to parallel data by the serial/parallel converter 121, the calculation circuit 122 is used to calculate step S1, the rearrangement circuit 123 and calculation circuit 124 are used to calculate step S2, the parallel/serial converter 125 is used to convert the parallel data from the calculation circuit 124 to serial data, the multiplier 126 is used to calculate step S3, and the matrix [C] in the frequency domain is output serially from the multiplier 126.

FIG. 2 is a view of the configuration of the calculation circuit 122.

The xx0 to xx7 shown in FIG. 2 are constituent elements of the vector [xx] shown by the following equation 10. The vector [xx] is comprised by the constituent elements of the row direction of the matrix [X] of equation 4. Further, yy0 to yy7 are the constituent elements of the vector [yy] shown by the following equation 11. The vector [yy] is comprised by the constituent elements of the row direction of the matrix [Y] of step S1.

$$[xx] = \begin{pmatrix} xx0 \\ xx1 \\ xx2 \\ xx3 \\ xx4 \\ xx5 \\ xx6 \\ xx7 \end{pmatrix} \quad (10)$$

$$[yy] = \begin{pmatrix} yy0 \\ yy1 \\ yy2 \\ yy3 \\ yy4 \\ yy5 \\ yy6 \\ yy7 \end{pmatrix} \quad (11)$$

The calculation circuit 122 receives as parallel input the 8 elements of input data (xx0, xx1, . . . , xx7) and outputs as parallel output the eight elements of output data (yy0, yy1, . . . , yy7).

In the calculation circuit 122, for example, the input data xx0 is added with the input data xx7 by an adder 90a. The result of the addition operation is output as xp0 to an adder 90b. At the adder 90b, xp0 and xp2 are added. The result of the addition operation is output as xr0 to the adder 90c. At the adder 90c, xr0 and xr1 are added. The result of the addition operation is output as yy0.

FIG. 3 is a view of the configuration of the serial/parallel converter 121.

In the serial/parallel converter 121, when data is input from an input terminal serially at a rate of one word every cycle, eight data are held at the registers (unit delay circuits) REG0 to REG7 after the end of 8 cycles, so these are transferred to the corresponding eight hold circuits HOLD0 to HOLD7. By obtaining the outputs from the hold circuits HOLD0 to HOLD7 from the output terminals of the same, 1-input, 8-output serial-to-parallel conversion is achieved.

FIG. 4 is a view of the configuration of the parallel/serial converter 125.

In the parallel/serial converter 125, eight data are input from eight input terminals in one cycle. The data are held in the registers REG8 to REG15 through the eight selectors SEL0 to SEL7. The selectors SEL0 to SEL7 are controlled by control signals from a control circuit, not shown, so that the registers REG8 to REG15 are connected in series at cycle 2 on. The data are output one word at a time from the output terminals over 8 cycles, so 8-input, 1-output parallel/serial conversion is achieved.

The hold circuits hold the data and basically are the same as registers. Accordingly, in the calculation circuit 100 of FIG. 1, 16 hold circuits are required in the serial/parallel converter 121 and eight in the parallel/serial converter 125, for a total of 24.

In the earlier filed Japanese patent application mentioned earlier, further, disclosure was made of a two-dimensional 8×8 IDCT system able to reduce the number of multiplication operations in the IDCT by dissolving the constant data matrix [N] shown in equation 1 into a matrix [G] of a diagonal component of irrational numbers and other components of all "0" and a matrix [F] of components of irrational numbers, "+1", or "−1", dissolving the constant data matrix [N'] into a matrix [G'] of the transpose matrix of the above matrix [G] and a matrix [F'] of the transpose matrix of the matrix [F], and performing the calculation based on these dissolved determinants.

With this two-dimensional 8×8 IDCT system, it was possible to transform the IDCT equation shown in equation 1 to equation 12 and calculate the following equation 12 by a routine of the following steps S1' to S3' so as to reduce the number of multiplication operations and therefore keep down the increase in size of computation circuits caused by an increase in the number of multipliers.

$$[X] = (1/4) [N^t] [C] [N] \quad (12)$$
$$= (1/4) [F^t] [G^t] [C] [G] [F]$$

$S1'$: Calculation of $[P] = (1/4) [G^t] [C] [G]$     (13)

$S2'$: Calculation of $[Q] = [P] [F]$ $S3'$: Calculation of $[X] = [F^t] [Q]$

The matrix [G] in equation 12 can be expressed by the following equation 14:

$$[G] = \begin{pmatrix} AA4 & 0 & 0 & 0 & 0 & 0 & 0 & 0 \\ 0 & AA7 & 0 & 0 & 0 & 0 & 0 & 0 \\ 0 & 0 & AA6 & 0 & 0 & 0 & 0 & 0 \\ 0 & 0 & 0 & AA5 & 0 & 0 & 0 & 0 \\ 0 & 0 & 0 & 0 & AA4 & 0 & 0 & 0 \\ 0 & 0 & 0 & 0 & 0 & AA3 & 0 & 0 \\ 0 & 0 & 0 & 0 & 0 & 0 & AA2 & 0 \\ 0 & 0 & 0 & 0 & 0 & 0 & 0 & AA1 \end{pmatrix} \quad (14)$$

where, $AAi = 1/\{2 \times \cos(i \times \pi/16)\}$ $i=1\sim7$

The matrix [F] in equation 12 can be expressed by the following equation 15:

$$[F] = \begin{pmatrix} +U44 & +U44 & +U44 & +U44 & +U44 & +U44 & +U44 & +U44 \\ +U17 & +U37 & +U57 & +U77 & -U77 & -U57 & -U37 & -U17 \\ +U26 & +U66 & -U66 & -U26 & -U26 & -U66 & +U66 & +U26 \\ +U35 & -U75 & -U15 & -U55 & +U55 & +U15 & +U75 & -U35 \\ +U44 & -U44 & -U44 & +U44 & +U44 & -U44 & -U44 & +U44 \\ +U53 & -U13 & +U73 & +U33 & -U33 & -U73 & +U13 & -U53 \\ +U62 & -U22 & +U22 & -U62 & -U62 & +U22 & -U22 & +U62 \\ +U71 & -U51 & +U31 & -U11 & +U11 & -U31 & +U51 & -U71 \end{pmatrix} \quad (15)$$

where, $Uhk = 2 \times \cos(h \times \pi/16) \times \cos(k \times \pi/16)$

Further, the matrix [G'] and matrix [F'] in equation 12 are transpose matrices of the matrix [G] and matrix [F] and can be expressed by the following equations 16 and 17:

$$[G'] = \begin{pmatrix} AA4 & 0 & 0 & 0 & 0 & 0 & 0 & 0 \\ 0 & AA7 & 0 & 0 & 0 & 0 & 0 & 0 \\ 0 & 0 & AA6 & 0 & 0 & 0 & 0 & 0 \\ 0 & 0 & 0 & AA5 & 0 & 0 & 0 & 0 \\ 0 & 0 & 0 & 0 & AA4 & 0 & 0 & 0 \\ 0 & 0 & 0 & 0 & 0 & AA3 & 0 & 0 \\ 0 & 0 & 0 & 0 & 0 & 0 & AA2 & 0 \\ 0 & 0 & 0 & 0 & 0 & 0 & 0 & AA1 \end{pmatrix} \quad (16)$$

where, $AAi = 1/\{2 \times \cos(i \times \pi/16)\}$ $i=1\sim7$ $$[F'] = \begin{pmatrix} +U44 & +U17 & +U26 & +U35 & +U44 & +U53 & +U62 & +U71 \\ +U44 & +U37 & +U66 & -U75 & -U44 & -U13 & -U22 & -U51 \\ +U44 & +U57 & -U66 & -U15 & -U44 & +U73 & +U22 & +U31 \\ +U44 & +U77 & -U26 & -U55 & +U44 & +U33 & -U62 & -U11 \\ +U44 & -U77 & -U26 & +U55 & +U44 & -U33 & -U62 & +U11 \\ +U44 & -U57 & -U66 & +U15 & -U44 & -U73 & +U22 & -U31 \\ +U44 & -U37 & +U66 & +U75 & -U44 & +U13 & -U22 & +U51 \\ +U44 & -U17 & +U26 & -U35 & +U44 & -U53 & +U62 & -U71 \end{pmatrix} \quad (17)$$

where, $Uhk = 2 \times \cos(h \times \pi/16) \times \cos(k \times \pi/16)$

FIG. 5 is a view of the configuration of a conventional two-dimensional 8×8 IDCT system for performing the calculation of equation 12.

As shown in FIG. 5, the two-dimensional 8×8 IDCT system 130 is comprised of a multiplier 131, a serial/parallel converter 121, a calculation circuit 133, a rearrangement circuit 134, a calculation circuit 135, and a parallel/serial converter 125.

In the two-dimensional 8×8 IDCT system 130, the frequency domain data, that is, the matrix [C], is received serially as input, the calculation of step S1' is performed serially at the multiplier 131, the result is converted to parallel data by the serial/parallel converter 121, the calculation circuit 133 is used to calculate step S2', the rearrangement circuit 134 and calculation circuit 135 are used to calculate step S3', the parallel/serial converter 125 is used to convert the parallel data from the calculation circuit 135 to serial data, and real domain image data, that is, the matrix [X], is output serially.

FIG. 6 is a view of the configuration of the calculation circuit 135.

The vector [yy] shown in FIG. 6 is expressed by equation 18 and the vector [xx] by equation 19. The vector [yy] is a vector comprised by the constituent elements of the row direction of the matrix obtained by rearranging by the rearrangement circuit 134 the rows and columns of the matrix [Q] produced at step S2'. The vector [xx] is a vector comprised of the constituent elements in the row direction of the real domain matrix [X] produced at step S3'.

$$[xx] = \begin{pmatrix} xx0 \\ xx1 \\ xx2 \\ xx3 \\ xx4 \\ xx5 \\ xx6 \\ xx7 \end{pmatrix} \quad (18)$$

-continued $$[yy] = \begin{pmatrix} yy0 \\ yy1 \\ yy2 \\ yy3 \\ yy4 \\ yy5 \\ yy6 \\ yy7 \end{pmatrix} \quad (19)$$

The calculation circuit 135 shown in FIG. 6 receives as parallel input the eight elements of input data (yy0, yy1, ..., yy7) and outputs as parallel output the eight elements of output data (xx0, xx1, ..., xx7).

In this two-dimensional 8×8 IDCT system 130 as well, in the same way as the two-dimensional 8×8 DCT system 100, a total of 24 registers is required in the serial/parallel converter 121 and parallel/serial converter 125.

In the two-dimensional 8×8 DCT system 100 and two-dimensional 8×8 IDCT system 130 of the related art, it was possible to reduce the number of multipliers and thereby the size of the circuit compared with the prior art by calculation of the routines of steps S1 to S3 and steps S1' to S3', but when inputting and outputting matrix data serially word by word, a serial/parallel converter 121 and parallel/serial converter 125 including a large number of registers became necessary like in the past as shown by FIGS. 1 and FIG. 5, so there was the problem that the size of that portion of the circuit ended up becoming larger.

SUMMARY OF THE INVENTION

To overcome the above disadvantages in the related art, the present invention has as its object the provision of a two-dimensional DCT system, two-dimensional IDCT system, and digital signal processing apparatus able to reduce the number of registers and further reduce the size of the circuit even when using word serial data as input/output data.

The present invention provides as its first aspect a two-dimensional DCT system which acts as a matrix data multiplication apparatus which multiplies with an input matrix from the left side and right side, respectively, a first coefficient matrix able to dissolve a matrix into a first matrix of at least one diagonal component of irrational numbers and other components of all "0" and a second matrix of components of irrational numbers, "+1", or "−1" and a second coefficient matrix of a transpose matrix of the first coefficient matrix able to dissolve a matrix into a third matrix of a transpose matrix of the second matrix and a fourth matrix of a transpose matrix of the first matrix and outputs the results of the multiplication operations, that is, the components of the output matrix, which includes a first calculation circuit for performing a predetermined calculation corresponding to a multiplication operation on the second matrix and the input matrix, a second calculation circuit for performing a predetermined calculation corresponding to a multiplication operation on the result of the multiplication operation of the first calculation circuit and the third matrix, and a multiplier which performs a predetermined calculation corresponding to calculation for multiplying with the result of multiplication of the second calculation circuit the first matrix from the left side and the fourth matrix from the right side, the first calculation circuit and the second calculation circuit having a plurality of memory elements connected in series and one or more arithmetic operation units for performing predetermined calculations using the data supplied from the memory elements and outputting the results of the calculations to predetermined memory elements, serially receiving as input the data from a first stage of memory elements, successively transferring the input data to a later stage of memory elements by the pipeline system, performing calculations by the arithmetic operation units in the process of transfer, and serially outputting the data showing the results of the calculations from the final stage of memory elements.

As clear from the above, in the two-dimensional DCT system of the present invention, data corresponding to the input matrix is input serially to the first calculation circuit, the first calculation circuit performs predetermined calculation corresponding to a multiplication operation of a second matrix of components of irrational numbers, "+1", or "−1" and the input matrix, and data showing the results of the calculation is output serially.

The data showing the results of the calculation of the first calculation circuit is input serially to the second calculation circuit, the second calculation circuit performs a predetermined calculation corresponding to a multiplication operation of the data showing the results of the calculation of the first calculation circuit and the transpose matrix of the second matrix, that is, a third matrix, and data showing the results of the calculation is output serially.

The data showing the results of the calculation of the second calculation circuit is input serially to the multiplier, the multiplier performs a predetermined calculation corresponding to a multiplication operation from the left side of the first matrix of at least one diagonal component of irrational numbers and other components of all "0" and a multiplication operation from the right side of the transpose matrix of the first matrix, that is, the fourth matrix, and data showing the results of the calculation is output serially.

The first calculation circuit and the second calculation circuit serially input the data to the first stage of memory elements and then transfer the input data to a later stage of memory elements successively by the pipeline system. Predetermined calculations are performed on this by arithmetic operators during the process of transfer. Data showing the results of the calculations is serially output from the final stage of memory elements.

Further, the present invention provides as its second aspect a two-dimensional IDCT system which acts as a matrix data multiplication apparatus which multiplies with an input matrix from the right side and left side, respectively, a first coefficient matrix able to dissolve a matrix into a first matrix of at least one diagonal component of irrational numbers and other components of all "0" and a second matrix of components of irrational numbers, "+1", or "−1" and a second coefficient matrix of a transpose matrix of the first coefficient matrix able to dissolve a matrix into a third matrix of a transpose matrix of the second matrix and a fourth matrix of a transpose matrix of the first matrix and outputs the results of the multiplication operations, that is, the components of the output matrix, which includes a multiplier for performing a calculation corresponding to calculation for multiplying with the input matrix the fourth matrix from the left side and the first matrix from the right side, a first calculation circuit for performing calculation corresponding to a multiplication operation of the result of the multiplication operation and the second matrix, and a second calculation circuit for performing calculation corresponding to a multiplication operation on the third matrix and the results of the multiplication operation of the first calculation circuit, the first calculation circuit and the second calculation circuit having a plurality of memory elements connected in series and one or more arithmetic operation units for performing predetermined calculations using the data supplied from the memory elements and outputting the results of the calculations to predetermined memory elements, serially receiving as input the data from a first stage of memory elements, successively transferring the input data to a later stage of memory elements by the pipeline system, performing calculations by the arithmetic operators in the process of transfer, and serially outputting the data showing the results of the calculations from the final stage of memory elements.

Further, the present invention provides as its third aspect a digital signal processing apparatus which has a plurality of memory elements connected in series and one or more arithmetic operation units for performing predetermined calculations using the data supplied from the memory elements and outputting the results of the calculations to predetermined memory elements and serially receives as input the data from a first stage of memory elements, successively transfers the input data to a later stage of memory elements by the pipeline system, performs calculations by the arithmetic operation units in the process of transfer, and serially outputs the data showing the results of the calculations from the final stage of memory elements.

BRIEF DESCRIPTION OF THE DRAWINGS

These and other objects and features of the present invention will become more apparent from the following more detailed description of the preferred embodiments made with reference to the-accompanying drawings, in which:

FIG. 10 is a view for explaining the content of the calculation for each clock cycle at each constituent element of the calculation circuit shown in FIG. 8;

FIG. 13 is a timing chart of the operation of the calculation circuit shown in FIG. 8 in the second embodiment;

FIG. 14 is a view for explaining the content of the calculation for each clock cycle at each constituent element of the calculation circuit shown in FIG. 8 in the second embodiment; and FIG. 15 is a view of the configuration of a digital signal processing apparatus according to a third embodiment of the present invention.

DESCRIPTION OF THE PREFERRED EMBODIMENTS

Figure 1:
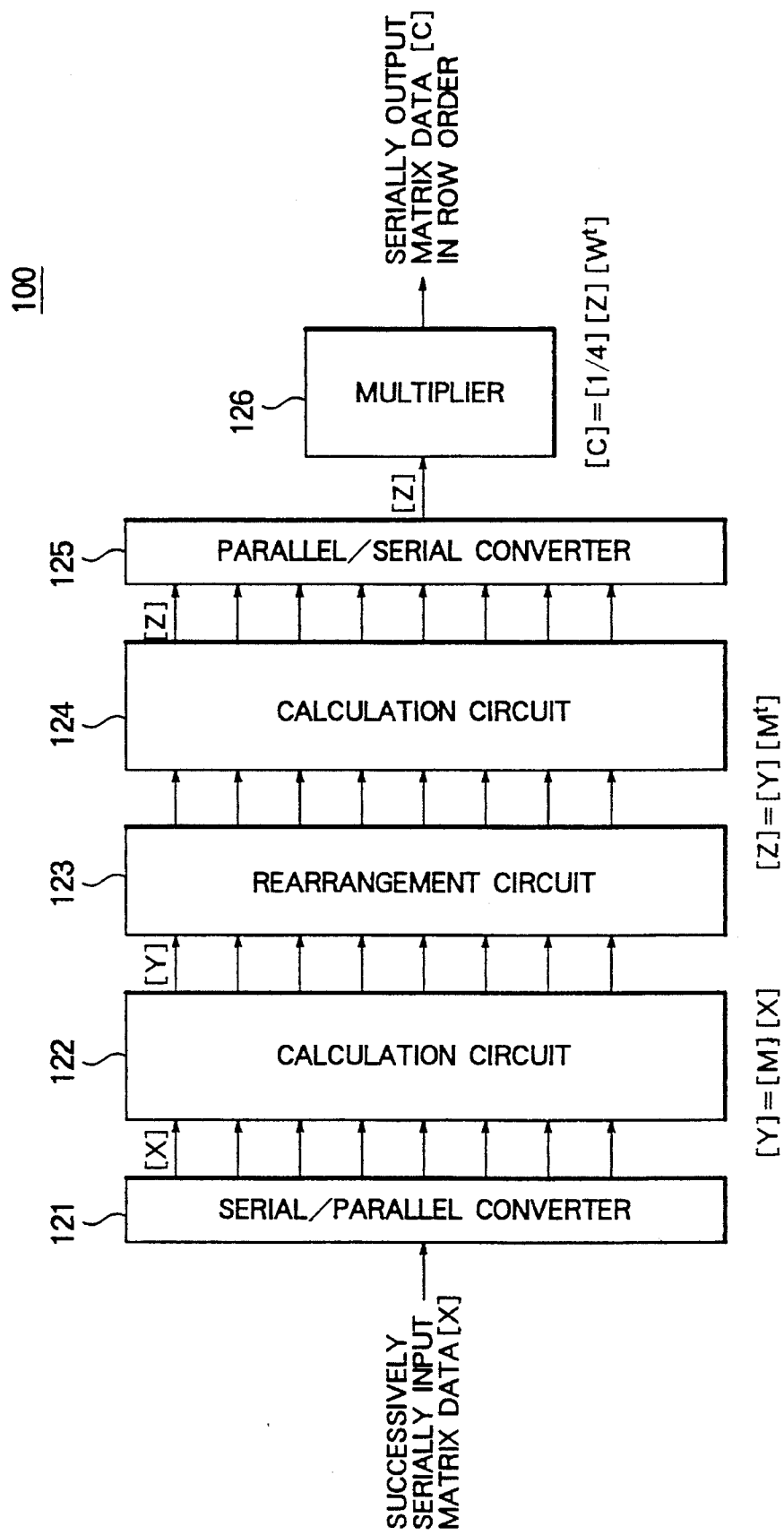
FIG. 1 is a view of the configuration of a conventional two-dimensional 8×8 DCT system.
Figure 2:
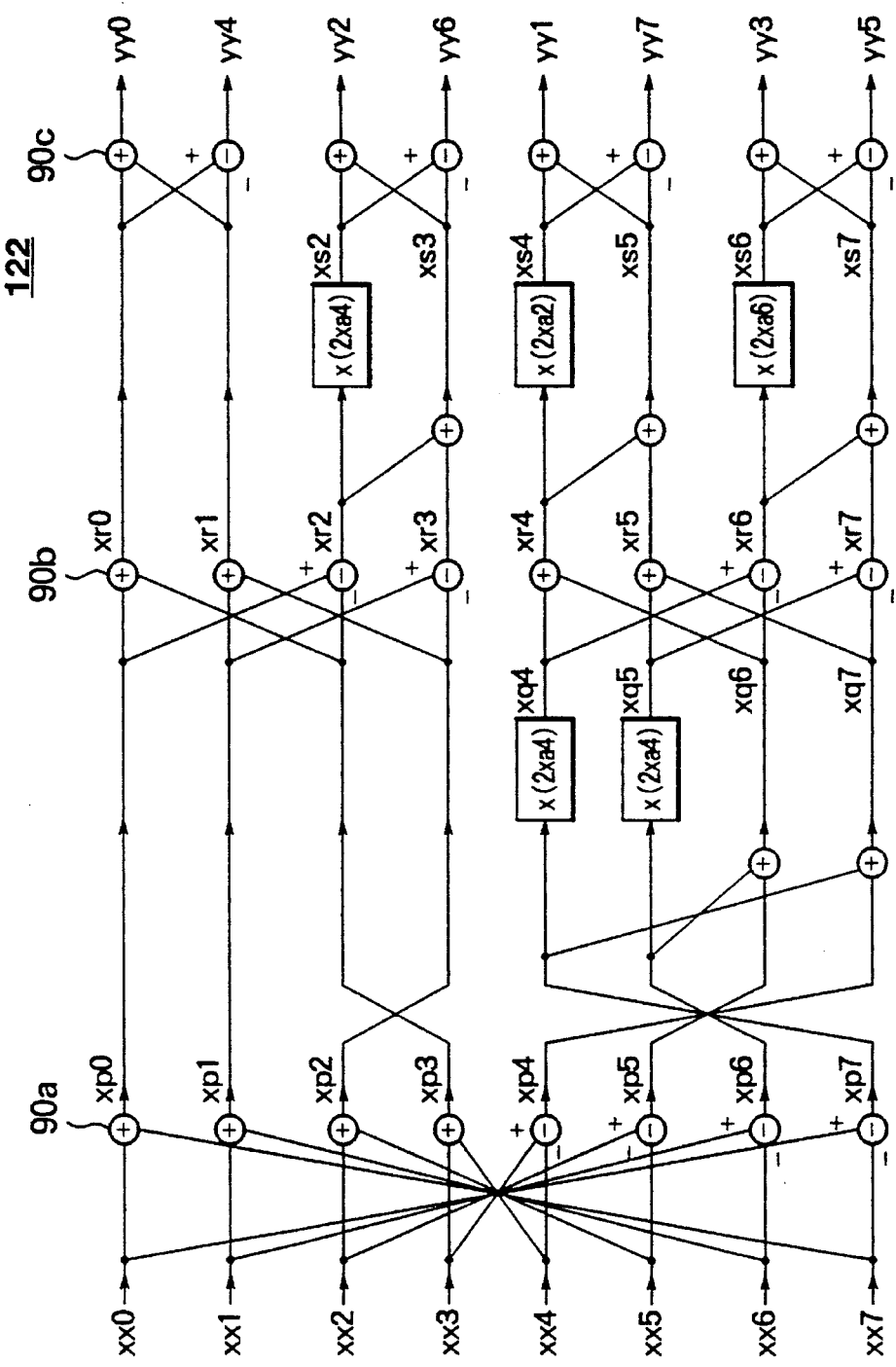
FIG. 2 is a view of the configuration of the calculation circuit shown in FIG. 1.

An explanation will be given of a first embodiment of the present invention.

The first embodiment will be explained with reference to a two-dimensional 8×8 DCT system for calculating equation 20 by the routine shown in steps S1 to S3 in the same way as with the conventional two-dimensional 8×8 DCT system 100 explained above:

$$[C] = (1/4) [N] [X] [N^t] \quad (20)$$
$$= (1/4) [W] [M] [X] [M^t] [W^t]$$

S1: Calculation of $[Y] = [M] [X]$ (21)

S2: Calculation of $[Z] = [Y] [M^t]$

S3: Calculation of $[C] = (1/4) [W] [Z] [W^t]$

The matrix [W] in equation 20 can be expressed by the following equation 22:

$$[W] = \begin{pmatrix} a4 & 0 & 0 & 0 & 0 & 0 & 0 & 0 \\ 0 & a7 & 0 & 0 & 0 & 0 & 0 & 0 \\ 0 & 0 & a6 & 0 & 0 & 0 & 0 & 0 \\ 0 & 0 & 0 & a5 & 0 & 0 & 0 & 0 \\ 0 & 0 & 0 & 0 & a4 & 0 & 0 & 0 \\ 0 & 0 & 0 & 0 & 0 & a3 & 0 & 0 \\ 0 & 0 & 0 & 0 & 0 & 0 & a2 & 0 \\ 0 & 0 & 0 & 0 & 0 & 0 & 0 & a1 \end{pmatrix} \quad (22)$$

where, $ai = \cos(i \times \pi/16)$

Further, the matrix [M] in equation 20 can be expressed by the following equation 23:

$$[M] = \begin{pmatrix} +1 & +1 & +1 & +1 & +1 & +1 & +1 & +1 \\ +a17 & +a37 & +a57 & +1 & -1 & -a57 & -a37 & -a17 \\ +a26 & +1 & -1 & -a26 & -a26 & -1 & +1 & +a26 \\ +a35 & -a75 & -a15 & -1 & +1 & +a15 & +a75 & -a35 \\ +1 & -1 & -1 & +1 & +1 & -1 & -1 & +1 \\ +a53 & -a13 & +a73 & +1 & -1 & -a73 & +a13 & -a53 \\ +a62 & -1 & +1 & -a62 & -a62 & +1 & -1 & +a62 \\ +a71 & -a51 & +a31 & -1 & +1 & -a31 & +a51 & -a71 \end{pmatrix} \quad (23)$$

where, $ai = \cos(i \times \pi/16)$

Further, the matrix $[W^t]$ and matrix $[M^t]$ in equation 20 are transpose matrices of the matrix [W] and matrix [M] and can be expressed by the following equations 24 and 25:

$$[W^t] = \begin{pmatrix} a4 & 0 & 0 & 0 & 0 & 0 & 0 & 0 \\ 0 & a7 & 0 & 0 & 0 & 0 & 0 & 0 \\ 0 & 0 & a6 & 0 & 0 & 0 & 0 & 0 \\ 0 & 0 & 0 & a5 & 0 & 0 & 0 & 0 \\ 0 & 0 & 0 & 0 & a4 & 0 & 0 & 0 \\ 0 & 0 & 0 & 0 & 0 & a3 & 0 & 0 \\ 0 & 0 & 0 & 0 & 0 & 0 & a2 & 0 \\ 0 & 0 & 0 & 0 & 0 & 0 & 0 & a1 \end{pmatrix} \quad (24)$$

where, $ai = \cos(i \times \pi/16)$ $$[M^t] = \quad (25)$$

$$\begin{pmatrix} +1 & +a17 & +a26 & +a35 & +1 & +a53 & +a62 & +a71 \\ +1 & +a37 & +1 & -a75 & -1 & -a13 & -1 & -a51 \\ +1 & +a57 & -1 & -a15 & -1 & +a73 & +1 & +a31 \\ +1 & +1 & -a26 & -1 & +1 & +1 & -a62 & -1 \\ +1 & -1 & -a26 & +1 & +1 & -1 & -a62 & +1 \\ +1 & -a57 & -1 & +a15 & -1 & -a73 & +1 & -a31 \\ +1 & -a37 & +1 & +a75 & -1 & +a13 & -1 & +a51 \\ +1 & -a17 & +a26 & -a35 & +1 & -a53 & +a62 & -a71 \end{pmatrix}$$

where, $ai = \cos(i \times \pi/16)$

Further, [X] in equation 20 is 8×8 real domain image data, and [C] is 8×8 frequency domain data corresponding to [X].

Figure 7:
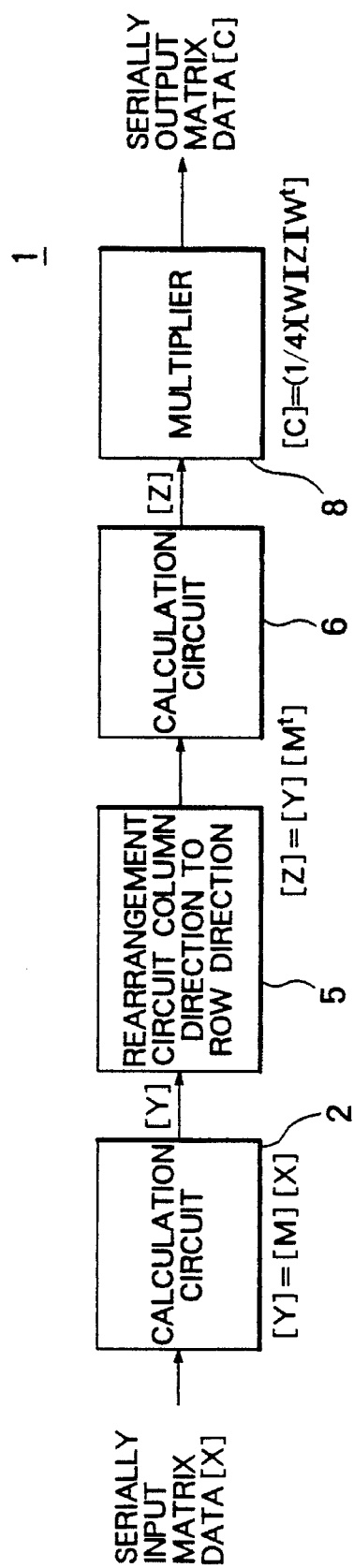
FIG. 7 is a view of the configuration of a two-dimensional DCT system according to a first embodiment of the present invention.

FIG. 7 is a view of the configuration of a two-dimensional 8×8 DCT system 1 of the present embodiment.

The two-dimensional 8×8 DCT system 1 is comprised of a calculation circuit 2, a rearrangement circuit 5, a calculation circuit 6, and a multiplier 8. The constituent elements receive serial data as input and output serial data.

Accordingly, in the two-dimensional 8×8 DCT system 1, there is no need for the serial/parallel converter and parallel/serial converter including the total 24 registers as in the two-dimensional 8×8 DCT system 100 explained above. Each constituent element can perform the processing of the serial data in its serial form as mentioned later and therefore it becomes possible to greatly cut the number of registers and further reduce the size of the circuit.

The calculation circuit 2 performs the calculation of the above step S1.

The rearrangement circuit 5 and calculation circuit 6 perform the calculation of step S2.

The multiplier 8 performs the calculation of step S3.

Figure 8:
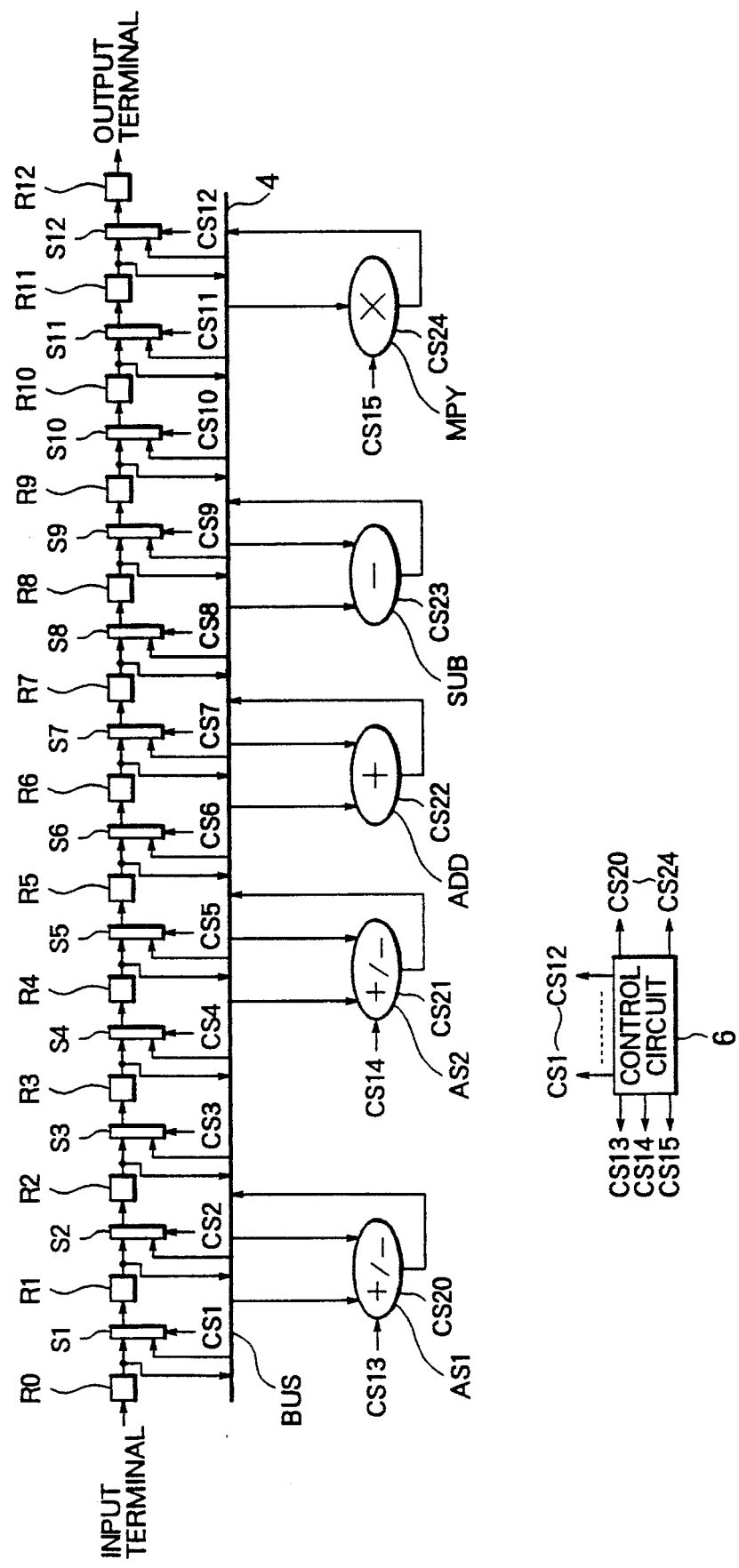
FIG. 8 is a view of the configuration of a calculation circuit shown in FIG. 7.

FIG. 8 is a view of the configuration of the calculation circuit 2 shown in FIG. 7.

As shown in FIG. 8, the calculation circuit 2 is comprised of a 13-stage pipeline register consisting of a register R0 connected to the input terminal, the registers R1 to R11, and the register R12 connected to the output terminal. Between adjoining registers are provided the selector registers S1 to S12. The selector register Si ($1 \leq i \leq 12$) outputs data from the register Ri-1 and bus 4 selectively to the register Ri based on the control signals CS1 to CS12 from a control circuit 6.

The calculation circuit 2 is provided with adder/subtractors AS1 and AS2, an adder ADD, a subtractor SUB, and a multiplier MPY. The adder/subtractors AS1 and AS2 are connected to the bus 4 and selectively perform addition and subtraction on the data supplied from the bus 4 at one clock cycles based on the addition/subtraction selection signals CS13 and CS14 and output the results of the calculation to the bus 4. The adder ADD is connected to the bus 4, performs addition on the data supplied from the bus 4 at one clock cycles, and outputs the results of the calculation to the bus 4. The subtractor SUB is connected to the bus 4, performs subtraction on the data supplied from the bus 4, and outputs the results of calculation to the bus 4. The multiplier MPY is connected to the bus 4, performs multiplication between the data supplied from the bus 4 and a coefficient indicated by a coefficient signal S15 from the control circuit 6, and outputs the results of calculation to the bus 4. The calculation in the multiplier MPY requires at least one clock cycle, so the multiplication operation is executed in a pipeline fashion. That is, it is possible to input data to the multiplier MPY successively with each clock cycle, but the results of the calculation would be output from the multiplier MPY delayed by a predetermined number of clock cycles.

The bus 4, however, is given a sufficient capacity so that there is no competition on it. Alternatively, when there is competition, data is made to be transmitted by time-sharing. Further, as mentioned later, if applied to a specific application such as an exclusive DCT circuit, there is no need to connect all the registers and all the arithmetic operation units by a bus. That is, there is no need to use the bus to connect combinations of registers and arithmetic operation units which are not used in the specific application.

An explanation will now be given of the case of performing the calculation of step S1 using the calculation circuit 2.

Figure 9:
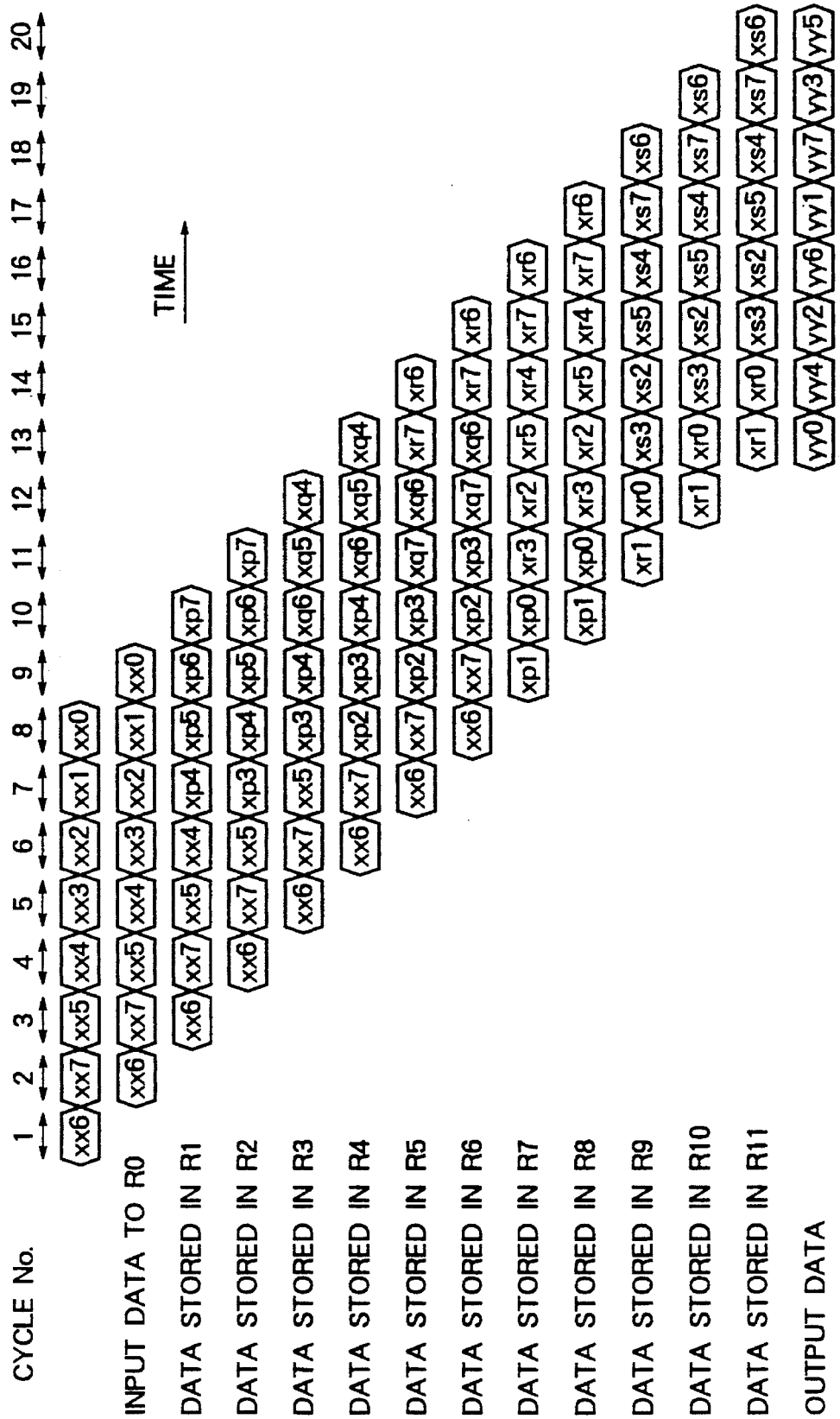
FIG. 9 is a timing chart of the operation of the calculation circuit shown in FIG. 8.

FIG. 9 is a timing chart of the calculation of step S1 using the calculation circuit 2.

FIG. 10 is a view for explaining the content of the calculation at each clock cycle in FIG. 9.

The xx0 to xx7, xp0 to xp7, xq4 to xq7, xr0 to xr7, xs2 to xs7, and yy0 to yy7 shown in FIG. 9 and FIG. 10 are the same as those shown in FIG. 14.

The input data xx0 to xx7 are successively input from the input terminal over one to eight clock cycles as shown in FIG. 9.

Here, the input data xx0 to xx7 constitute a vector comprised of the constituent elements of the row direction of the matrix [X] of equation 20.

The following calculation is performed using as a unit a vector in the row direction constituting the matrix [X]. By performing the calculation for all vectors in the row direction, the calculation of equation 20 is performed on the matrix [X].

The input data are successively output to the later stage registers R0 to R12 and the bus 4 with each clock cycle. The input data output to the bus 4 are supplied to the predetermined adder/subtractors AS1 and AS2, the adder ADD, the subtractor SUB, or the multiplier MPY based on the arithmetic operation instruction signals CS20 to CS24 from the control circuit 6 where calculation is performed in accordance with step S1. The results of the calculation at the adder/subtractors AS1 and AS2, the adder ADD, the subtractor SUB, or the multiplier MPY are output to the selectors S1 to S12 and are output to the predetermined registers R1 to R12 in accordance with the control signals CS1 to CS12.

The control circuit 6 outputs to the adder/subtractors AS1 and AS2, the adder ADD, the subtractor SUB, and the multiplier MPY the control signals CS1 to CS12, arithmetic operation instruction signals CS20 to CS24, addition/subtraction selection signals CS13 and CS14, and coefficient signal S14 so that the calculation of step S1 is executed by the routine shown in FIG. 10.

Figure 3:
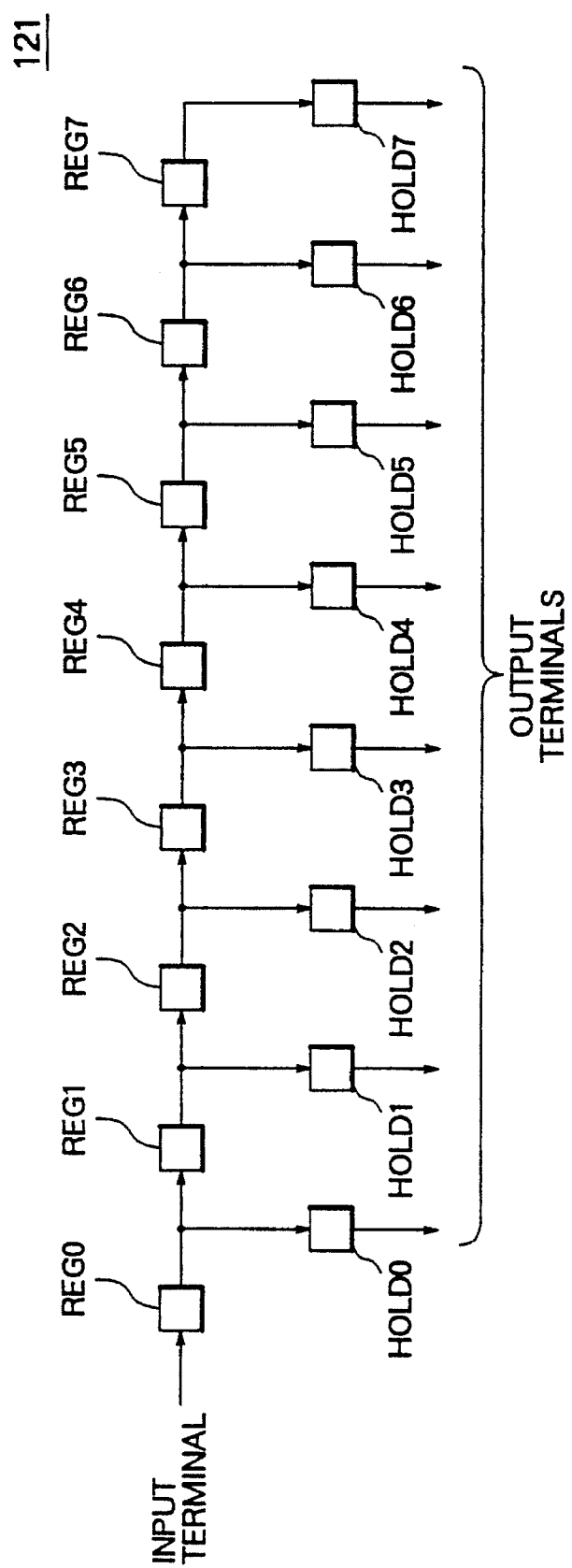
FIG. 3 is a view of the configuration of the serial/parallel converter shown in FIG. 1.
Figure 4:
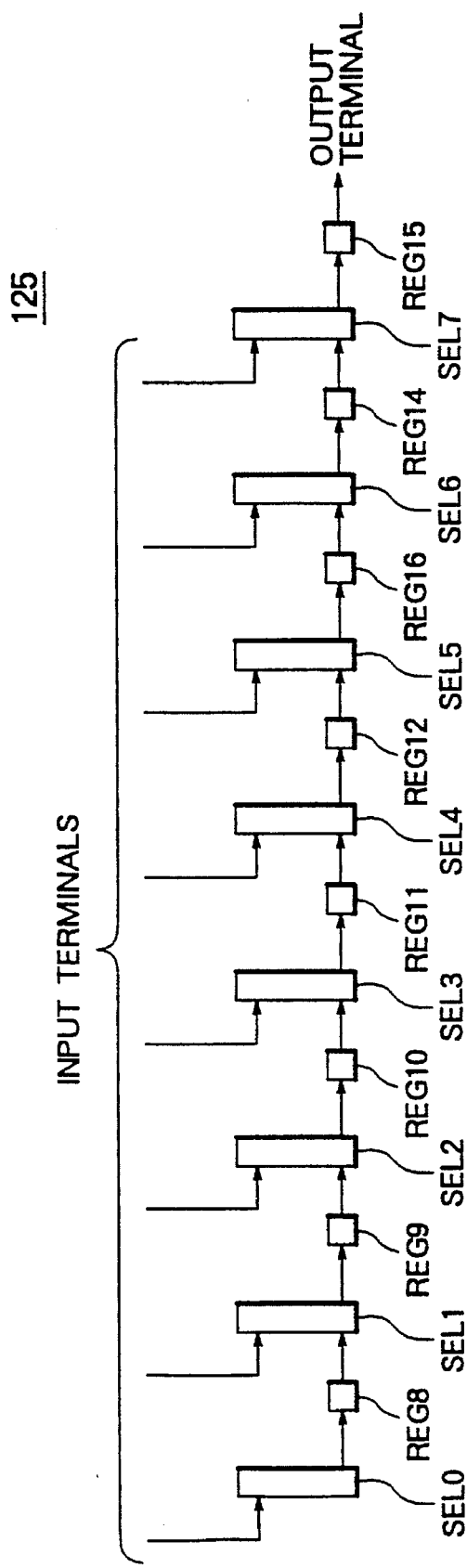
FIG. 4 is a view of the configuration of a parallel/serial converter shown in FIG. 1.
Figure 5:
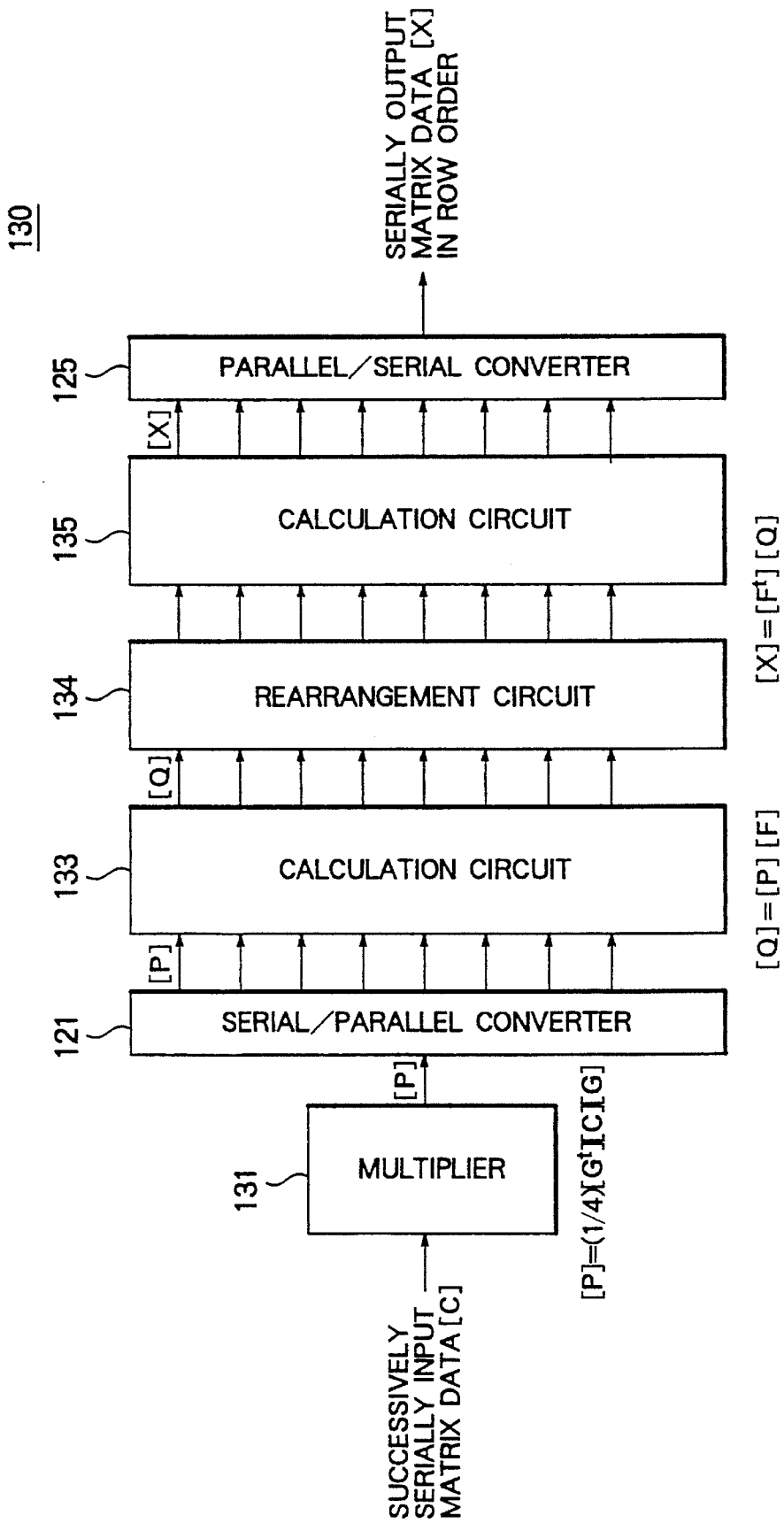
FIG. 5 is a view of the configuration of a conventional two-dimensional 8×8 IDCT system.

An explanation will next be made of the calculation routine in the calculation circuit 2 for each clock cycle using FIG. 3 and FIG. 4.

Clock cycles 1 to 8: The eight elements of the matrix data [X] are input from the input terminal and successively output from the later stage registers in the order of xx0, xx1, xx2, xx3, xx4, xx5, xx7, and xx6.

Clock cycle 6: As shown in FIG. 3, the data xx2 is input from the input terminal and the data xx3, xx4, xx5, xx7, and xx6 are stored in the registers R0 to R4.

At the calculation circuit 2, at clock cycle 6, as shown in FIG. 10, the data xx3 stored in the register R0 and the data xx4 stored in the register R1 are supplied to the adder ADD and the subtractor SUB through the bus The data xx3 and data xx4 are added at the adder ADD, the data xx3 and data xx4 are subtracted from each other at the subtractor SUB, the result xp3 of the addition at the adder ADD is stored in the register R2, and the result xp4 of the subtraction at the subtractor SUB is stored in the register R1.

That is, at the time when the clock cycle 6 ends, the data xp3 is stored in the register R2 and the data xp4 is stored in the register R1.

Clock cycle 7: The adder ADD adds the data xx2 stored in the register R0 and the data xx5 stored in the register R3. The result xp2 of the addition is stored in the register Further, the subtractor SUB subtracts the data xx2 stored in the register R0 and the data xx5 stored in the register R3 from each other. The result xp5 of the subtraction is stored in the register R1.

Clock cycle 8: The adder ADD adds the data xx1 stored in the register R0 and the data xx6 stored in the register R6. The result xp1 of the addition is stored in the register R7.

Further, the subtractor SUB subtracts the data xx1 stored in the register R0 and the data xx6 stored in the register R6 from each other. The result xp6 of the subtraction is stored in the register R1.

Clock cycle 9: The multiplier MPY receives as input the data xp6 stored in the register R1 through the bus 14 based on a coefficient signal S15 and arithmetic operation instruction signal S24 from the control circuit 6, multiplies the data xp6 and the coefficient A4 ($=2 \times \cos(4 \times \pi/16)$) shown by the coefficient signal S15, and stores the result xq5 of the multiplication in the register R3 through the bus 14 at the time of the end of clock cycle 10.

The calculation at the multiplier MPY is performed by pipeline processing as mentioned earlier. The result of the multiplication of the data input at the clock cycle 9 is output at the end of the clock cycle 10.

The adder/subtractor AS2 adds the data xp5 stored in the register R2 and the data xp6 stored in the register R1. The result xq6 of the addition is stored in the register R3.

The adder ADD adds the data xx0 stored in the register R0 and the data xx7 stored in the register R6. The result xp0 of the addition is stored in the register R7.

Further, the subtractor SUB subtracts the data xx0 stored in the register R0 and the data xx7 stored in the register R6 from each other. The result xp7 of the subtraction is stored in the register R1.

Clock cycle 10: The multiplier MPY multiplies the data xp7 stored in the register R1 and the coefficient A4 ($=2 \times \cos(4 \times \pi/16)$) and stores the result xq4 of the multiplication in the register R3 at the time of the end of clock cycle 11.

The adder/subtractor AS2 adds the data xp4 stored in the register R4 and the data xp7 stored in the register R1. The result xq7 of the addition is stored in the register R5.

The adder ADD adds the data xp1 stored in the register R8 and the data xp2 stored in the register R6. The result xr1 of the addition is stored in the register R9.

Further, the subtractor SUB subtracts the data xp1 stored in the register R8 and the data xp2 stored in the register R6 from each other. The result xr3 of the subtraction is stored in the register R7.

Clock cycle 11: The adder ADD adds the data xp0 stored in the register R8 and the data xp3 stored in the register R6. The result xr0 of the addition is stored in the register R9.

Further, the subtractor SUB subtracts the data xp0 stored in the register R8 and the data xp3 stored in the register R6 from each other. The result xr2 of the subtraction is stored in the register R7.

Clock cycle 12: The adder/subtractor AS1 adds the data xr1 stored in the register R10 and the data xr0 stored in the register R9. The result yy0 of the addition is stored in the register R12.

The multiplier MPY multiplies the data xr2 stored in the register R7 and the coefficient A4 ($=2 \times \cos(4 \times \pi/16)$) and stores the result xs2 of the multiplication in the register R9 at the time of the end of clock cycle 13.

The adder/subtractor AS2 adds the data xr3 stored in the register R8 and the data xr2 stored in the register R7. The result xs2 of the addition is stored in the register R9.

The adder ADD adds the data xq5 stored in the register R4 and the data xq7 stored in the register R6. The result xr5 of the addition is stored in the register R7.

Further, the subtractor SUB subtracts the data xq5 stored in the register R4 and the data xq7 stored in the register R6 from each other. The result xr7 of the subtraction is stored in the register R5.

Clock cycle 13: The adder/subtractor AS1 subtracts the data xr0 stored in the register R10 and the data xr1 stored in the register R1 from each other. The result yy4 of the subtraction is stored in the register R12.

The adder ADD adds the data xq4 stored in the register R4 and the data xq6 stored in the register R6. The result xr4 of the addition is stored in the register R7.

Further, the subtractor SUB subtracts the data xq4 stored in the register R4 and the data xq6 stored in the register R6 from each other. The result xr6 of the subtraction is stored in the register R5.

Clock cycle 14: The adder/subtractor AS1 adds the data xs3 stored in the register R10 and the data xs2 stored in the register R9. The result yy2 of the addition is stored in the register R12.

The multiplier MPY multiplies the data xr4 stored in the register R7 and the coefficient A2 ($=2 \times \cos(2 \times \pi/16)$) and stores the result xs4 of the multiplication in the register R9 at the time of the end of clock cycle 15.

The adder/subtractor AS2 adds the data xr5 stored in the register R8 and the data xr4 stored in the register R7. The result xs5 of the addition is stored in the register R9.

Clock cycle 15: The adder/subtractor AS1 subtracts the data xs2 stored in the register R10 and the data xs3 stored in the register R11 from each other. The result yy6 of the subtraction is stored in the register R12.

Clock cycle 16: The adder/subtractor AS1 adds the data xs5 stored in the register R10 and the data xs4 stored in the register R9. The result yy1 of the addition is stored in the register R12.

The multiplier MPY multiplies the data xr6 stored in the register R7 and the coefficient A6 ($=2\pi\cos(6 \times \pi/16)$) and stores the result xs6 of the multiplication in the register R9 at the time of the end of clock cycle 17.

The adder/subtractor AS2 adds the data xr7 stored in the register R8 and the data xr6 stored in the register R7. The result xs7 of the addition is stored in the register R9.

Clock cycle 17: The adder/subtractor AS1 subtracts the data xs4 stored in the register R10 and the data xs5 stored in the register R11 from each other. The result yy7 of the subtraction is stored in the register R12.

Clock cycle 18: The adder/subtractor AS1 adds the data xs7 stored in the register R10 and the data xs6 stored in the register R9. The result yy3 of the addition is stored in the register R12.

Clock cycle 19: The adder/subtractor AS1 subtracts the data xs6 stored in the register R10 and the data xs7 stored in the register R11 from each other. The result yy5 of the subtraction is stored in the register R12.

In this way, in the calculation circuit 2, as shown in FIG. 9 and FIG. 10, the data yy0, yy4, yy2, yy6, yy1, yy7, yy3, and yy5 are output from the clock cycles 13 to 20.

As explained above, according to the calculation circuit 2, it is possible to execute the calculation at step S1 in the form of serial input and output of data.

The calculation circuit 6 has the same configuration as the calculation circuit 2 shown in FIG. 8. The control circuit 6 outputs to the adder/subtractors AS1 and AS2, the adder ADD, the subtractor SUB, and the multiplier MPY the control signals CS1 to CS12, arithmetic operation instruction signals CS20 to CS24, addition/subtraction selection signals CS13 and CS14, and coefficient signal S14 so that the calculation of step S2 is executed using the data from the rearrangement circuit 5.

Figure 11:
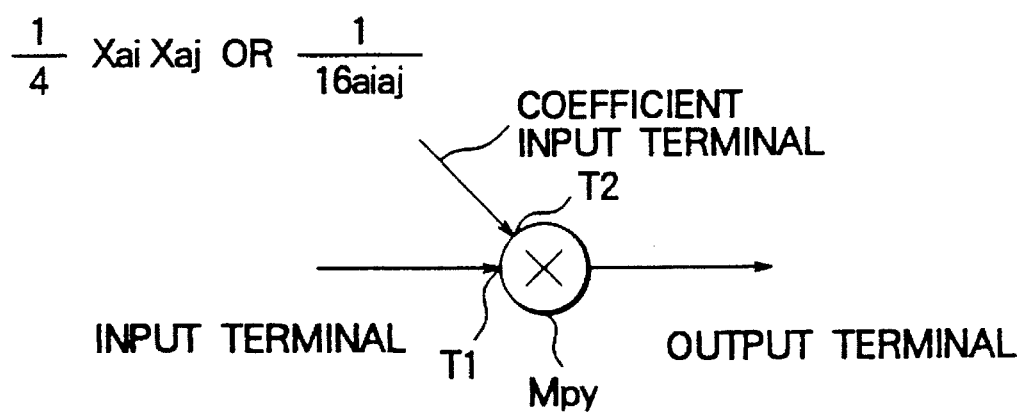
FIG. 11 is a view for explaining a divider of the calculation circuit shown in FIG. 8.

The multiplier 8 serially receives as input the elements Zhk of the 8×8 matrix [Z] of step S3 at the input terminal T1 of the multiplication circuit MPY shown in FIG. 11 and receives as input a suitable value for calculation of step S3 everyclock cycle, that is, $(1/4) \times a_i \times a_j$, at the input terminal T2 of the multiplication circuit MPY so as thereby to perform the calculation of step S3. It outputs the result of calculation serially from the output terminal.

As mentioned above, in the two-dimensional 8×8 DCT system 1 of the embodiment, the calculation circuit 2, the rearrangement circuit 5, the calculation circuit 6, and the multiplier 8 each serially receive data as input and serially output data.

Accordingly, in the two-dimensional 8×8 DCT system 1, there is no need for the serial/parallel converter and parallel/serial converter including the total 24 registers as in the conventional two-dimensional 8×8 DCT system 100 explained above. By using calculation circuits 2 and 6 including the 13 registers R0 to R12, it is possible to process the input data in the form of serial data and therefore to greatly cut the number of registers and further reduce the size of the circuit.

An explanation will now be given of a second embodiment.

This embodiment will be explained with reference to a two-dimensional 8×8 IDCT system for calculating equation by the routine shown in steps S1' to S3' in the same way as with the conventional two-dimensional 8×8 IDCT system 130 explained above:

$$[X] = (1/4)[N^t][C][N] \quad (26)$$

$$= (1/4)[F^t][G^t][C][G][F]$$

S1': Calculation of $[P] = (1/4)[G^t][C][G]$  
S2': Calculation of $[Q] = [P][F]$     (27)  
S3': Calculation of $[X] = [F^t][Q]$ The matrix [G] in equation 26 can be expressed by the following equation 28:

$$[G] = \begin{pmatrix} AA4 & 0 & 0 & 0 & 0 & 0 & 0 & 0 \\ 0 & AA7 & 0 & 0 & 0 & 0 & 0 & 0 \\ 0 & 0 & AA6 & 0 & 0 & 0 & 0 & 0 \\ 0 & 0 & 0 & AA5 & 0 & 0 & 0 & 0 \\ 0 & 0 & 0 & 0 & AA4 & 0 & 0 & 0 \\ 0 & 0 & 0 & 0 & 0 & AA3 & 0 & 0 \\ 0 & 0 & 0 & 0 & 0 & 0 & AA2 & 0 \\ 0 & 0 & 0 & 0 & 0 & 0 & 0 & AA1 \end{pmatrix} \quad (28)$$

where, $AAi = 1/\{2 \times \cos(i \times \pi/16)\}$ $i = 1\sim7$

Further, the matrix [F] in equation 26 can be expressed by the following equation 29:

$$[F] = \begin{pmatrix} +U44 & +U44 & +U44 & +U44 & +U44 & +U44 & +U44 & +U44 \\ +U17 & +U37 & +U57 & +U77 & -U77 & -U57 & -U37 & -U17 \\ +U26 & +U66 & -U66 & -U26 & -U26 & -U66 & +U66 & +U26 \\ +U35 & -U75 & -U15 & -U55 & +U55 & +U15 & +U75 & -U35 \\ +U44 & -U44 & -U44 & +U44 & +U44 & -U44 & -U44 & +U44 \\ +U53 & -U13 & +U73 & +U33 & -U33 & -U73 & +U13 & -U53 \\ +U62 & -U22 & +U22 & -U62 & -U62 & +U22 & -U22 & +U62 \\ +U71 & -U51 & +U31 & -U11 & +U11 & -U31 & +U51 & -U71 \end{pmatrix} \quad (29)$$

where, $Uhk = 2 \times \cos(h \times \pi/16) \times \cos(k \times \pi/18)$

Further, the matrix [G'] and matrix [F'] in equation 26 are transpose matrices of the matrix [G] and matrix [F] and can be expressed by the following equations 30 and 31:

$$[G^t] = \begin{pmatrix} AA4 & 0 & 0 & 0 & 0 & 0 & 0 & 0 \\ 0 & AA7 & 0 & 0 & 0 & 0 & 0 & 0 \\ 0 & 0 & AA6 & 0 & 0 & 0 & 0 & 0 \\ 0 & 0 & 0 & AA5 & 0 & 0 & 0 & 0 \\ 0 & 0 & 0 & 0 & AA4 & 0 & 0 & 0 \\ 0 & 0 & 0 & 0 & 0 & AA3 & 0 & 0 \\ 0 & 0 & 0 & 0 & 0 & 0 & AA2 & 0 \\ 0 & 0 & 0 & 0 & 0 & 0 & 0 & AA1 \end{pmatrix} \quad (30)$$

where, $AAi = 1/\{2 \times \cos(i \times \pi/16)\}$ $i = 1\sim7$ $$[F^t] = \begin{pmatrix} +U44 & +U17 & +U26 & +U35 & +U44 & +U53 & +U62 & +U71 \\ +U44 & +U37 & +U66 & -U75 & -U44 & -U13 & -U22 & -U51 \\ +U44 & +U57 & -U66 & -U15 & -U44 & +U73 & +U22 & +U31 \\ +U44 & +U77 & -U26 & -U55 & +U44 & +U33 & -U62 & -U11 \\ +U44 & -U77 & -U26 & +U55 & +U44 & -U33 & -U62 & +U11 \\ +U44 & -U57 & -U66 & +U15 & -U44 & -U73 & +U22 & -U31 \\ +U44 & -U37 & +U66 & +U72 & -U44 & +U13 & -U22 & +U51 \\ +U44 & -U17 & +U26 & -U35 & +U44 & -U53 & +U62 & -U71 \end{pmatrix} \quad (31)$$

where, $Uhk = 2 \times \cos(h \times \pi/16) \times \cos(k \times \pi/16)$

Figure 12:
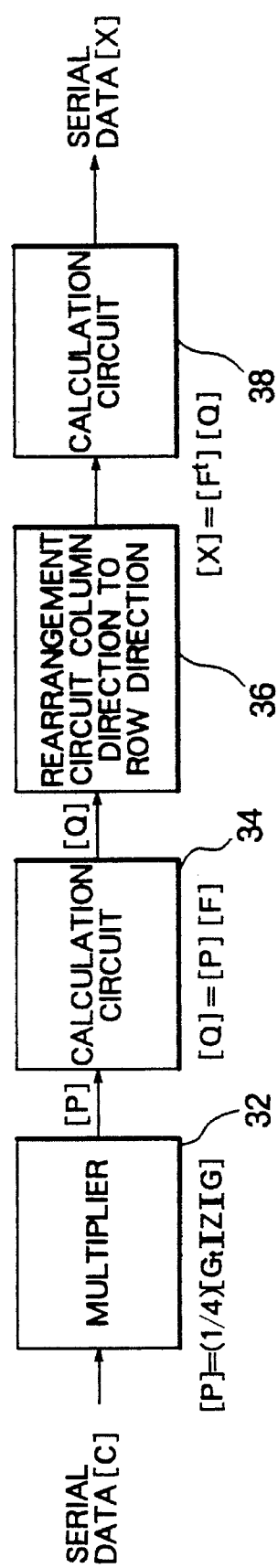
FIG. 12 is a view of the configuration of a two-dimensional IDCT system according to a second embodiment of the present invention.

FIG. 12 is a view of the configuration of a two-dimensional 8×8 IDCT system 30 of the present embodiment.

The two-dimensional 8×8 IDCT system 30 is comprised of a multiplier 32, a calculation circuit 34, a rearrangement circuit 36, and a calculation circuit 38. The constituent elements receive serial data as input and output serial data.

Accordingly, in the two-dimensional 8×8 IDCT system 30, there is no need for the serial/parallel converter and parallel/serial converter including the total 24 registers as in the conventional two-dimensional 8×8 IDCT system 130 explained above. Each constituent element can perform the processing of the serial data in its serial form as mentioned later and therefore it becomes possible to greatly cut the number of registers and further reduce the size of the circuit.

The multiplier 32 performs the calculation of step S1'.

The calculation circuit 34 performs the calculation of step S2'.

The rearrangement circuit 36 and calculation circuit 38 perform the calculation of step S3'.

The multiplier 32 receives as input the elements Chk of the 8×8 matrix [C] of step S1' at the input terminal T1 of the multiplication circuit MPY shown in FIG. 11 and receives as input a suitable value for calculation of step S1' everyclock cycle, that is, $(\frac{1}{4}) \times a_i \times a_j$, at the coefficient input terminal T2 of the multiplication circuit MPY so as to calculate step S1'. It outputs the result of the calculation from the output terminal in a serial fashion.

The calculation circuit 34 has the same configuration as the calculation circuit 2 of the two-dimensional 8×8 DCT system 1 explained above. The control circuit 6 outputs to the adder/subtractors AS1 and AS2, the adder ADD, the subtractor SUB, and the multiplier MPY the control signals CS1 to CS12, arithmetic operation instruction signals CS20 to CS24, addition/subtraction selection signals CS13 and CS14, and coefficient signal S14 so that the calculation of step S2' is executed using the data of the multiplier 32.

The calculation circuit 38 has the same configuration as the calculation circuit 2 of the two-dimensional 8×8 DCT system 1 explained above. The control circuit 6 outputs to the adder/subtractors AS1 and AS2, the adder ADD, the subtractor SUB, and the multiplier MPY the control signals CS1 to CS12, arithmetic operation instruction signals CS20 to CS24, addition/subtraction selection signals CS13 and CS14, and coefficient signal S14 so that the calculation of step S3' is executed using the data from the rearrangement circuit 36.

An explanation will next be made of the calculation of step S3' using the calculation circuit 38.

FIG. 13 is a timing chart for the calculation of step S3' using the calculation circuit 38.

FIG. 14 is a view for explaining the content of the calculation for each clock cycle in FIG. 13.

Figure 6:
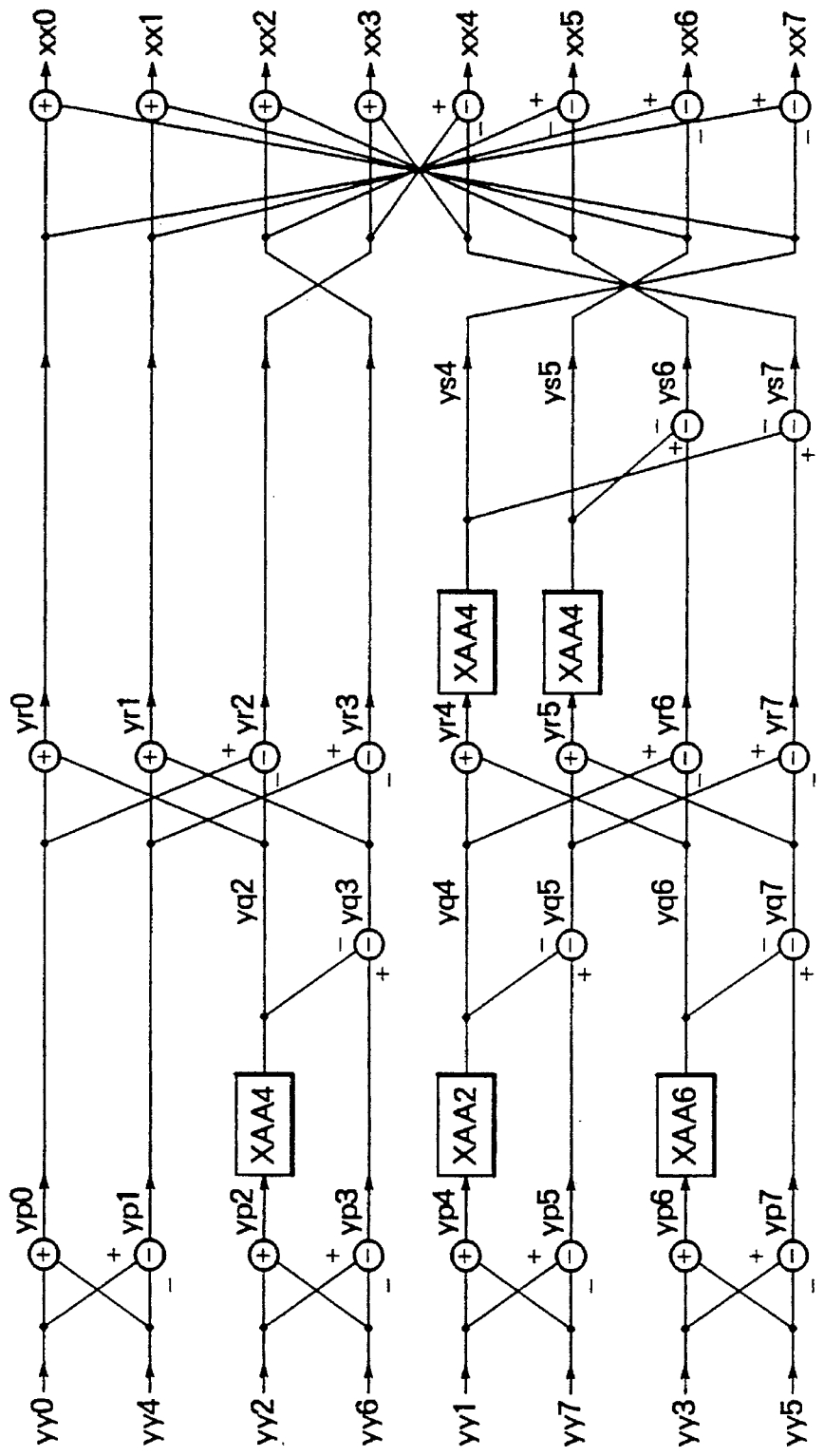
FIG. 6 is a view of the configuration of the calculation circuit shown in FIG. 5.

The yy0 to yy7, yp0 to yp7, yg4 to yg7, yr0 to yr7, ys2 to ys7, and xx0 to xx7 shown in FIG. 13 and FIG. 14 are the same as those shown in FIG. 6.

Here, yy0 to yy7 constitute a vector comprised of the constituent elements of the row directions in the matrix obtained by rearrangement by the rearrangement circuit 36 of the columns and rows of the matrix [Q] calculated at step S2'. xx0 to xx7 constitute a vector comprised of the constituent elements in the row direction of the real domain matrix [X] produced at step S3'.

Clock cycles 1 to 8: The eight elements of the matrix data [Y] are input from the input terminal and successively output from the later stage registers in the order of yy3, yy5, yy1, yy7, yy2, yy6, yy0, and yy4.

Clock cycle 3: The adder/subtractor AS1 adds the data yy5 stored in the register R0 and the data yy3 stored in the register R1. The result yp6 of the addition is stored in the register R3.

Clock cycle 4: The adder/subtractor AS1 subtracts the data yy3 stored in the register R2 and the data yy5 stored in the register R1 from each other. The result yp7 of the subtraction is stored in the register R3.

The multiplier MPY multiplies the data yp6 stored in the register R3 and the coefficient AA6 indicated by the coefficient signal S15 $(=1/\{2 \times \cos(6 \times \pi/16)\})$ and stores the result yq6 of the multiplication in the register R5 at the time of the end of clock cycle 5.

Clock cycle 5: The adder/subtractor AS1 adds the data yy7 stored in the register R0 and the data yy1 stored in the register R1. The result yp4 of the addition is stored in the register R3.

Clock Cycle 6: The adder/subtractor AS1 subtracts the data yy1 stored in the register R2 and the data yy7 stored in the register R1 from each other. The result yp5 of the subtraction is stored in the register R3.

The multiplier MPY multiplies the data yp4 stored in the register R3 and the coefficient AA2 indicated by the coefficient signal S15 $(=1/\{2 \times \cos(2 \times \pi/16)\})$ and stores the result yq4 of the multiplication in the register R5 at the time of the end of clock cycle 7.

The adder/subtractor AS2 subtracts the data yp7 stored in the register R4 and the data yq6 stored in the register R5 from each other. The result yq7 of the subtraction is stored in the register R5.

Clock cycle 7: The adder/subtractor AS1 adds the data yy6 stored in the register R0 and the data yy2 stored in the register R1. The result yp2 of the addition is stored in the register R3.

Clock cycle 8: The adder/subtractor AS1 subtracts the data yy2 stored in the register R2 and the data yy6 stored in the register R1 from each other. The result yp3 of the subtraction is stored in the register R3.

The multiplier MPY multiplies the data yp2 stored in the register R3 and the coefficient AA4 indicated by the coefficient signal S15 $(=1/\{2 \times \cos(4 \times \pi/16)\})$ and stores the result yq2 of the multiplication in the register R5 at the time of the end of clock cycle 9.

The adder/subtractor AS2 subtracts the data yp5 stored in the register R4 and the data yq4 stored in the register R5 from each other. The result yq5 of the subtraction is stored in the register R5.

The adder ADD adds the data yq4 stored in the register R5 and the data yq6 stored in the register R7. The result yr4 of the addition is stored in the register R8.

Further, the subtractor SUB subtracts the data yq4 stored in the register R5 and the data yq6 stored in the register R7 from each other. The result yr6 of the subtraction is stored in the register R6.

Clock cycle 9: The adder/subtractor AS1 adds the data yy4 stored in the register R0 and the data yy0 stored in the register R1. The result yp0 of the addition is stored in the register R3.

The multiplier MPY multiplies the data yr4 stored in the register R8 and the coefficient AA4 indicated by the coefficient signal S15 $(=1/\{2 \times \cos(4 \times \pi/16)\})$ and stores the result ys4 of the multiplication in the register R10 at the time of the end of clock cycle 10.

The adder ADD adds the data yq5 stored in the register R5 and the data yq7 stored in the register R7. The result yr5 of the addition is stored in the register R8.

Further, the subtractor SUB subtracts the data yp5 stored in the register R5 and the data yq7 stored in the register R7 from each other. The result yr7 of the subtraction is stored in the register R6.

Clock cycle 10: The adder/subtractor AS1 subtracts the data yy0 stored in the register R2 and the data yy4 stored in the register R1 from each other. The result yp1 of the subtraction is stored in the register R3.

The multiplier MPY multiplies the data yr5 stored in the register R8 and the coefficient AA4 indicated by the coefficient signal S15 ($=1/\{2\times\cos(4\times\pi/16)\}$) and stores the result ys4 of the multiplication in the register R10 at the time of the end of clock cycle 11.

The adder/subtractor AS2 subtracts the data yp3 stored in the register R4 and the data yq2 stored in the register R5 from each other. The result yq3 of the subtraction is stored in the register R5.

The adder ADD adds the data yq0 stored in the register R3 and the data yq2 stored in the register R5. The result yr0 of the addition is stored in the register R4.

Further, the subtractor SUB subtracts the data yq0 stored in the register R3 and the data yq2 stored in the register R5 from each other. The result yr2 of the subtraction is stored in the register R6.

Clock cycle 11: The adder/subtractor AS2 subtracts the data yr7 stored in the register R7 and the data ys4 stored in the register R10 from each other. The result ys7 of the subtraction is stored in the register R8.

The adder ADD adds the data yp1 stored in the register R3 and the data yq3 stored in the register R5. The result yr1 of the addition is stored in the register R4.

Further, the subtractor SUB subtracts the data yp1 stored in the register R3 and the data yq3 stored in the register R5 from each other. The result yr3 of the subtraction is stored in the register R6.

Clock cycle 12: The adder/subtractor AS1 subtracts the data yr6 stored in the register R9 and the data ys5 stored in the register R10 from each other. The result ys6 of the subtraction is stored in the register R10.

The adder ADD adds the data yr0 stored in the register R5 and the data ys4 stored in the register R11. The result xx0 of the addition is stored in the register R12.

Further, the subtractor SUB subtracts the data yr0 stored in the register R5 and the data ys4 stored in the register R11 from each other. The result yx7 of the subtraction is stored in the register R6.

Clock cycle 13: The adder ADD adds the data yr1 stored in the register R5 and the data ys5 stored in the register R1. The result xx1 of the addition is stored in the register R12.

Further, the subtractor SUB subtracts the data yr1 stored in the register R5 and the data ys5 stored in the register R11 from each other. The result yx6 of the subtraction is stored in the register R6.

Clock cycle 14: The adder ADD adds the data yr3 stored in the register R8 and the data ys6 stored in the register R11. The result xx2 of the addition is stored in the register R12.

Further, the subtractor SUB subtracts the data yr3 stored in the register R8 and the data ys6 stored in the register R11 from each other. The result xx5 of the subtraction is stored in the register R9.

Clock cycle 15: The adder ADD adds the data yr2 stored in the register R10 and the data ys7 stored in the register R11. The result xx3 of the addition is stored in the register R12.

Further, the subtractor SUB subtracts the data yr2 stored in the register R10 and the data ys7 stored in the register R11 from each other. The result xx4 of the subtraction is stored in the register R11.

In this way, in the calculation circuit 38, as shown in FIG. 13 and FIG. 14, the data xx0, xx1, xx2, xx3, xx4, xx5, xx7, and xx6 are output from the clock cycles 13 to 20.

As explained above, in the two-dimensional 8×8 IDCT system 30 of the embodiment, the multiplier 32, the calculation circuit 34, the rearrangement circuit 36, and the calculation circuit 38 each serially receive data as input and serially output data.

Accordingly, in the two-dimensional 8×8 IDCT system 30, there is no need for the serial/parallel converter and parallel/serial converter including the total 24 registers as in the conventional two-dimensional 8×8 IDCT system 130 explained above. By using calculation circuits 34 and 38 including the 13 registers R0 to R12, it is possible to process the input data in the form of serial data and therefore to greatly cut the number of registers and further reduce the size of the circuit.

An explanation will now be given of a third embodiment.

This embodiment will be explained with reference to a digital signal processing apparatus 50—a general type of digital signal processing apparatus in which predetermined calculations by arithmetic operation units are performed in the process of data being successively transferred to later stage registers in a pipeline register comprised of a plurality of serially connected registers.

FIG. 15 is a view of the configuration of the digital signal processing apparatus 50.

As shown in FIG. 15, the digital signal processing apparatus 50 is comprised of the pipeline register 52, the bus 62, and the arithmetic operation units 54, 56, 58, and 60.

The pipeline register 52 is comprised of the combination of registers and selectors shown in FIG. 8. The registers are connected with the bus 62, the data input serially from the input terminal is successively transferred to the later stage registers, and the transferred data is output serially from the output terminal in the end.

The bus 62 is connected to the arithmetic operation units 54 to 60. Based on control signals from a control circuit, not shown, data from the registers comprising the pipeline register 52 pass through the bus 62 and are supplied to the predetermined arithmetic operation units 54 to 60 for calculation there.

The results of the calculations at the arithmetic operation units 54 to 60 are output to predetermined registers of the pipeline register 52 based on the control signals from the control circuit, not shown.

In the digital signal processing apparatus, in the same way as with the two-dimensional 8×8 DCT system 1, predetermined control signals are output from the control circuit, not shown, to the pipeline register 52 and arithmetic operation units 54 to 60, so that predetermined calculations are performed using the data input serially from the input terminal and the results of the calculations are serially output from the output terminal.

According to the digital signal processing apparatus of this embodiment, serial data can be processed as it is and the processed data can be output as serial data without use of a serial/parallel converter and parallel/serial converter including a large number of registers, so it is possible to slash the number of registers and reduce the size of the circuit.

According to the two-dimensional DCT system, two-dimensional IDCT system, and digital signal processing apparatus of the present invention, there is no need for a serial/parallel converter and parallel/serial converter requiring a large number of registers even when using serial data as the input data and output data and therefore it is possible to slash the number of registers.

Further, according to the two-dimensional DCT system, two-dimensional IDCT system, and digital signal processing apparatus of the present invention, since it is possible to slash the number of registers, it is possible to reduce the size of the systems and apparatus.

What is claim is:

1. A two-dimensional DCT system which acts as a matrix data multiplication apparatus which multiplies with an input matrix from the left side, a first coefficient matrix able to dissolve a matrix into a first matrix of at least one diagonal component of irrational numbers and other components of all "0" and a second matrix of components of irrational numbers, "+1", or "−1" and from the right side, a second coefficient matrix of a transpose matrix of said first coefficient matrix able to dissolve a matrix into a third matrix of a transpose matrix of said second matrix and a fourth matrix of a transpose matrix of said first matrix and outputs the results of the multiplication operations, that is, the components of the output matrix, said DCT system comprising:

a first calculation circuit for performing a predetermined calculation corresponding to a multiplication operation on said second matrix and said input matrix;

a second calculation circuit for performing a predetermined calculation corresponding to a multiplication operation on the result of the multiplication operation of said first calculation circuit and said third matrix; and a multiplier which performs a predetermined calculation corresponding to calculation for multiplying with the result of multiplication of said second calculation circuit said first matrix from said left side and said fourth matrix from said right side, each of said first calculation circuit and said second calculation circuit having a plurality of stages of memory elements connected in series and arranged in a pipeline system and one or more arithmetic operation units for performing predetermined calculations using the data supplied from said memory elements and outputting the results of said calculations to predetermined memory elements, and each of said first calculation circuit and said second calculation circuit serially receiving as input the data from a first stage of memory elements, successively transferring said input data to a later stage of memory elements by said pipeline system, performing calculations by said one or more arithmetic operation units in a transfer process, and serially outputting said data showing said results of said calculations from the final stage of said memory elements.

2. A two-dimensional DCT system as set forth in claim 1, wherein said results of calculation of said first calculation circuit are arranged in columns and rows and further comprising a rearrangement circuit for rearranging the columns and rows of said results of calculation of said first calculation circuit, provided between said first calculation circuit and said second calculation circuit.

3. A two-dimensional DCT system as set forth in claim 1, wherein said first calculation circuit and said second calculation circuit each have two adder/subtractors, an adder, a subtractor, and a multiplier.

4. A two-dimensional IDCT system which acts as a matrix data multiplication apparatus which multiplies with an input matrix from the right side, a first coefficient matrix able to dissolve a matrix into a first matrix of at least one diagonal component of irrational numbers and other components of all "0" and a second matrix of components of irrational numbers, "+1", or "−1" and from the left side, a second coefficient matrix of a transpose matrix of said first coefficient matrix able to dissolve a matrix into a third matrix of a transpose matrix of said second matrix and a fourth matrix of a transpose matrix of said first matrix and outputs the results of the multiplication operations, that is, the components of the output matrix, said IDCT system comprising:

a multiplier for performing a calculation corresponding to calculation for multiplying with said input matrix and said fourth matrix from the left side and said first matrix from the right side;

a first calculation circuit for performing calculation corresponding to a multiplication operation of the result of the multiplication operation and said second matrix; and a second calculation circuit for performing calculation corresponding to a multiplication operation on said third matrix and the results of the multiplication operation of said first calculation circuit, each of said first calculation circuit and said second calculation circuit having a plurality of stages of memory elements connected in series and arranged in a pipeline system and one or more arithmetic operation units for performing predetermined calculations using the data supplied from said memory elements and outputting said results of said calculations to predetermined memory elements, and each of said first calculation circuit and said second calculation circuit serially receiving as input the data from a first stage of said memory elements, successively transferring the input data to a later stage of said memory elements by said pipeline system, performing calculations by said one or more arithmetic operation units in a transfer process, and serially outputting the data showing the results of the calculations from the final stage of said memory elements.

5. A two-dimensional IDCT system as set forth in claim 4, wherein said results of calculation of said first calculation circuit are arranged in columns and rows and further comprising a rearrangement circuit for rearranging the columns and rows of said results of calculation of said first calculation circuit, provided between said first calculation circuit and said second calculation circuit.

6. A two-dimensional IDCT system as set forth in claim 4, wherein said first calculation circuit and said second calculation circuit each have two adder/subtractors, an adder, a subtractor, and a multiplier.

7. A two-dimensional DCT method characterized in that in the following two-dimensional DCT equation 1-1 for two-dimensional DCT of 8×8 real domain image matrix data [X] to 8×8 frequency domain matrix data [C], $$DCT: [C]=(\tfrac{1}{4})[N][X][N^t] \qquad (1\text{-}1)$$

[W] is defined by the following determinant:

$$[W] = \begin{pmatrix} a4 & 0 & 0 & 0 & 0 & 0 & 0 & 0 \\ 0 & a7 & 0 & 0 & 0 & 0 & 0 & 0 \\ 0 & 0 & a6 & 0 & 0 & 0 & 0 & 0 \\ 0 & 0 & 0 & a5 & 0 & 0 & 0 & 0 \\ 0 & 0 & 0 & 0 & a4 & 0 & 0 & 0 \\ 0 & 0 & 0 & 0 & 0 & a3 & 0 & 0 \\ 0 & 0 & 0 & 0 & 0 & 0 & a2 & 0 \\ 0 & 0 & 0 & 0 & 0 & 0 & 0 & a1 \end{pmatrix} \quad (1\text{-}2)$$

where, $ai = \cos(i \times \pi/16)$ $i=0\sim7$

[M] is defined by the following determinant:

$$[M] = \begin{pmatrix} +1 & +1 & +1 & +1 & +1 & +1 & +1 & +1 \\ +a17 & +a37 & +a57 & +1 & -1 & -a57 & -a37 & -a17 \\ +a26 & +1 & -1 & -a26 & -a26 & -1 & +1 & +a26 \\ +a35 & -a75 & -a15 & -1 & +1 & +a15 & +a75 & -a35 \\ +1 & -1 & -1 & +1 & +1 & -1 & -1 & +1 \\ +a53 & -a13 & +a73 & +1 & -1 & -a73 & +a13 & -a53 \\ +a62 & -1 & +1 & -a62 & -a62 & +1 & -1 & +a62 \\ +a71 & -a51 & +a31 & -1 & +1 & -a31 & +a51 & -a71 \end{pmatrix} \quad (1\text{-}3)$$

where, $ai = \cos(i \times \pi/16)$ $i=0\sim7$

[$W^t$], the transpose matrix of [W], is defined by the following determinant:

$$[W^t] = \begin{pmatrix} a4 & 0 & 0 & 0 & 0 & 0 & 0 & 0 \\ 0 & a7 & 0 & 0 & 0 & 0 & 0 & 0 \\ 0 & 0 & a6 & 0 & 0 & 0 & 0 & 0 \\ 0 & 0 & 0 & a5 & 0 & 0 & 0 & 0 \\ 0 & 0 & 0 & 0 & a4 & 0 & 0 & 0 \\ 0 & 0 & 0 & 0 & 0 & a3 & 0 & 0 \\ 0 & 0 & 0 & 0 & 0 & 0 & a2 & 0 \\ 0 & 0 & 0 & 0 & 0 & 0 & 0 & a1 \end{pmatrix} \quad (1\text{-}4)$$

where, $ai = \cos(i \times \pi/16)$ $i=0\sim7$

[$M^t$], the transpose matrix of the matrix [M], is defined by the following determinant:

$$[M^t] = \begin{pmatrix} +1 & +a17 & +a26 & +a35 & +1 & +a53 & +a62 & +a71 \\ +1 & +a37 & +1 & -a75 & -1 & -a13 & -1 & -a51 \\ +1 & +a57 & -1 & -a15 & -1 & +a75 & +1 & +a31 \\ +1 & +1 & -a26 & -1 & +1 & +1 & -a62 & -1 \\ +1 & -1 & -a26 & +1 & +1 & -1 & -a62 & +1 \\ +1 & -a57 & -1 & +a15 & -1 & -a73 & +1 & -a31 \\ +1 & -a37 & +1 & +a75 & -1 & +a13 & -1 & +a51 \\ +1 & -a17 & +a26 & -a35 & +1 & -a53 & +a62 & -a71 \end{pmatrix} \quad (1\text{-}5)$$

where, $ai = \cos(i \times \pi/16)$ $i=0\sim7$ and the calculation of the two-dimensional DCT equation 1-1 is performed by three steps:

a first step in which elements of the image data [X] are successively transferred to later stage memory elements serially by a pipeline system and calculation corresponding to the following equation 1-6 is performed in the process of transfer to serially calculate the results of calculation of [Y], $$[Y]=[M][X] \quad (1\text{-}6)$$

a second step in which the results of calculation [Y] of the first step are successively transferred to later stage memory elements serially by a pipeline system and calculation corresponding to the following equation 1-7 is performed in the process of transfer to serially calculate the results of calculation of [Z], and $$[Z]=[Y][M^t] \quad (1\text{-}7)$$

a third step in which the results of calculation [Z] of the second step are used to perform multiplication corresponding to the following equation 1-8 to calculate the results of multiplication, that is, [C]:

$$[C]=(\tfrac{1}{4})[W][Z][W^t] \quad (1\text{-}8).$$

8. A two-dimensional IDCT method characterized in that in the following two-dimensional IDCT equation 2-1 for two-dimensional IDCT of 8×8 frequency domain matrix data [C] to 8×8 real domain image matrix data [X], $$\text{IDCT: } [X]=(\tfrac{1}{4})[N^t][C][N] \quad (2\text{-}1)$$

[F] is defined by the following determinant:

$$[F] = \begin{pmatrix} +U44 & +U44 & +U44 & +U44 & +U44 & +U44 & +U44 & +U44 \\ +U17 & +U37 & +U57 & +U77 & -U77 & -U57 & -U37 & +U17 \\ +U26 & +U66 & -U66 & -U26 & -U26 & -U66 & +U66 & +U26 \\ +U35 & -U75 & -U15 & -U55 & +U55 & +U15 & +U75 & -U35 \\ +U44 & -U44 & -U44 & +U44 & +U44 & -U44 & -U44 & +U44 \\ +U53 & -U13 & +U73 & +U33 & -U33 & -U73 & +U13 & -U53 \\ +U62 & -U22 & +U22 & -U62 & -U62 & +U22 & -U22 & +U62 \\ +U71 & -U51 & +U31 & -U11 & +U11 & -U31 & +U51 & -U71 \end{pmatrix} \quad (2\text{-}2)$$

where, $Uhk = 2 \times \cos(h \times \pi/16) \times \cos(k \times \pi/16)$

[G] is defined by the following determinant:

$$[G] = \begin{pmatrix} AA4 & 0 & 0 & 0 & 0 & 0 & 0 & 0 \\ 0 & AA7 & 0 & 0 & 0 & 0 & 0 & 0 \\ 0 & 0 & AA6 & 0 & 0 & 0 & 0 & 0 \\ 0 & 0 & 0 & AA5 & 0 & 0 & 0 & 0 \\ 0 & 0 & 0 & 0 & AA4 & 0 & 0 & 0 \\ 0 & 0 & 0 & 0 & 0 & AA3 & 0 & 0 \\ 0 & 0 & 0 & 0 & 0 & 0 & AA2 & 0 \\ 0 & 0 & 0 & 0 & 0 & 0 & 0 & AA1 \end{pmatrix} \quad (2\text{-}3)$$

where, $AAi = 1/\{2 \times \cos(i \times \pi/16)\}$ $i=1\sim7$

[$F^t$], the transpose matrix of [F], is defined by the following determinant:

$$[F^t] = \begin{vmatrix} +U44 & +U17 & +U26 & +U35 & +U44 & +U53 & +U62 & +U71 \\ +U44 & +U37 & +U66 & -U75 & -U44 & -U13 & -U22 & -U51 \\ +U44 & +U57 & -U66 & -U15 & -U44 & +U73 & +U22 & +U31 \\ +U44 & +U77 & -U26 & -U55 & +U44 & +U33 & -U62 & -U11 \\ +U44 & -U77 & -U26 & +U55 & +U44 & -U33 & -U62 & +U11 \\ +U44 & -U57 & -U66 & +U15 & -U44 & -U73 & +U22 & -U31 \\ +U44 & -U37 & +U66 & +U75 & -U44 & +U13 & -U22 & +U51 \\ +U44 & -U17 & +U26 & -U35 & +U44 & -U53 & +U62 & -U71 \end{vmatrix} \quad (2\text{-}4)$$

where, Uhk=2×cos (h×π/16)×cos (k×π/16)

$[G^t]$, the transpose matrix of the matrix $[G]$, is defined by the following determinant:

$$[G^t] = \begin{vmatrix} AA4 & 0 & 0 & 0 & 0 & 0 & 0 & 0 \\ 0 & AA7 & 0 & 0 & 0 & 0 & 0 & 0 \\ 0 & 0 & AA6 & 0 & 0 & 0 & 0 & 0 \\ 0 & 0 & 0 & AA5 & 0 & 0 & 0 & 0 \\ 0 & 0 & 0 & 0 & AA4 & 0 & 0 & 0 \\ 0 & 0 & 0 & 0 & 0 & AA3 & 0 & 0 \\ 0 & 0 & 0 & 0 & 0 & 0 & AA2 & 0 \\ 0 & 0 & 0 & 0 & 0 & 0 & 0 & AA1 \end{vmatrix} \quad (2\text{-}5)$$

where, AAi=1/{2×cos (i×π/16)} i=1~7 and the calculation of the two-dimensional IDCT equation 2-1 is performed by three steps:

a first step in which elements of the frequency domain data [C] are used to perform multiplication corresponding to the following equation 2-6 to serially calculate the results of multiplication [P]:

$$[P]=(\tfrac{1}{4})[G^t][C][G] \quad (2\text{-}6)$$

a second step in which elements of the results of multiplication of [P] of the first step are successively transferred to later stage memory elements serially by a pipeline system and calculation corresponding to the following equation 2-7 is performed in the process of transfer to serially calculate the results of calculation of [Q], and $$[Q]=[P][F] \quad (2\text{-}7)$$

a third step in which the results of calculation of [Q] of the second step are successively transferred to later stage memory elements serially by a pipeline system and calculation corresponding to the following equation 2-8 is performed in the process of transfer to serially calculate the results of calculation of [X]:

$$[X]=[F^t][Q] \quad (2\text{-}8).$$

* * * * *